(12) United States Patent
Hatakeyama

(10) Patent No.: US 8,698,355 B2
(45) Date of Patent: Apr. 15, 2014

(54) COMMUNICATION DEVICE, COMMUNICATION METHOD AND COMMUNICATION SYSTEM

(75) Inventor: Kouichi Hatakeyama, Tokyo (JP)

(73) Assignee: Sony Corporation (JP)

( * ) Notice: Subject to any disclaimer, the term of this patent is extended or adjusted under 35 U.S.C. 154(b) by 592 days.

(21) Appl. No.: 13/065,092

(22) Filed: Mar. 14, 2011

(65) Prior Publication Data

US 2011/0234013 A1    Sep. 29, 2011

(30) Foreign Application Priority Data

Mar. 26, 2010   (JP) ................ P2010-072502

(51) Int. Cl.
 *H01F 27/42* (2006.01)
(52) U.S. Cl.
 USPC .......................................... 307/104
(58) Field of Classification Search
 USPC ................ 307/104; 455/41.1, 41.2
 See application file for complete search history.

(56) References Cited

U.S. PATENT DOCUMENTS

| | | | |
|---|---|---|---|
| 8,219,154 B2 * | 7/2012 | Wakamatsu ............ | 455/572 |
| 8,457,550 B2 * | 6/2013 | Goto et al. ............. | 455/41.1 |
| 2006/0244693 A1 | 11/2006 | Yamaguchi et al. | |
| 2009/0033638 A1 | 2/2009 | Yamaguchi et al. | |
| 2009/0227282 A1 | 9/2009 | Miyabayashi et al. | |
| 2011/0302042 A1 * | 12/2011 | Hatakeyama ........... | 705/26.1 |

FOREIGN PATENT DOCUMENTS

JP    2006-301864 A    11/2006
JP    2009-218845 A    9/2009

* cited by examiner

*Primary Examiner* — Jared Fureman
*Assistant Examiner* — Duc M Pham
(74) *Attorney, Agent, or Firm* — Lerner, David, Littenberg, Krumholz & Mentlik, LLP

(57) ABSTRACT

A communication device including: a first slave communication section performing first communication which is proximity communication at a first communication speed; a second slave communication section performing a second communication which is proximity communication at a second communication speed faster than the first communication speed; and an electrical power reception section receiving electrical power to perform the second communication transmitted using wireless electrical power transmission from a master communication device, wherein the first slave communication section transmits configuration information including a maximum electrical power consumption consumed in the second communication to the master communication device using the first communication, the electrical power reception section receives electrical power which begins being transmitted from the master communication device after the first communication, and the second slave communication section begins operating using electrical power received by the electrical power reception section and begins the second communication with the master communication device.

16 Claims, 12 Drawing Sheets

COMMUNICATION DEVICE, COMMUNICATION METHOD AND COMMUNICATION SYSTEM

CROSS-REFERENCE TO RELATED APPLICATION

The present application claims priority from Japanese Patent Application No. JP 2010-072502 filed in the Japanese Patent Office on Mar. 26, 2010, the entire content of which is incorporated herein by reference.

BACKGROUND OF THE INVENTION

1. Field of the Invention

The present invention relates to a communication device, a communication method and a communication system, and in particular, to a communication device, a communication method and a communication system able to suppress unnecessary electrical power consumption in, for example, high-speed proximity communication.

2. Description of the Related Art

In recent years, proximity communication, where wireless communication is performed by non-contact at a close distance using IC (Integrated Circuit) cards or the like, is used for, for example, electronic commuter tickets, electronic money and the like, and also, mobile phone devices, which have an electronic commuter ticket or electronic money function using proximity communication, are in widespread use.

Proximity communication has been standardized as, for example, ISO/IEC 14443 or ISO/IEC 18092 (referred to below as NFC (Near Field Communication)).

As a communication method performing communication which complies with the NFC standards, for example, there are communication methods called type A, type B and type C.

For example, the type C method is adopted in the IC card system called FeliCa (registered trademark) of Sony Corp. who is the present applicant.

However, for example, the type C above adopts a 13.56 MHz carrier and performs proximity communication at a communication speed of 212 kbps (kilo bits per second) or 424 kbps.

Additionally, in the type A and the type B, proximity communication is performed at a communication speed of 106 kbps which is a lower speed than in type C.

As per above, since the NFC communication speed is a low speed at approximately a few hundred kbps, it is not able to be said that it is suited for the transmission of large amounts of data such as image contents.

On the other hand, in NFC, it is possible to specify the communication parties and perform mutual authentication only by holding an IC card over a RW (Reader/Writer).

Therefore, a handover is proposed (for example, Japanese Unexamined Patent Application Publication No. 2009-218845) where communication is begun initially by NFC, and after that, the communication method is changed to high-speed communication which has a communication speed faster than NFC such as wireless LAN or Bluetooth (registered trademark).

SUMMARY OF THE INVENTION

However, recently, proximity communication at communication speeds faster than NFC has becoming widespread. As a communication method of high-speed proximity communication such as this, for example, there is TransferJet (registered trademark).

TransferJet (registered trademark) adopts a 4.48 GHz carrier and performs proximity communication at a communication speed of a maximum of 560 Mbps.

By applying TransferJet (registered trademark) as described above to an IC card system, it is possible to rapidly perform the transmission of large amounts of data such as image contents between an IC card and a RW which performs data reading and writing with the IC card.

However, in a case when an IC card, which performs the high-speed proximity communication of TransferJet (registered trademark) or the like, is configured in a small size such as roughly the size of a credit card, it is difficult for a battery to be mounted in the IC card.

Additionally, even if it was supposed that it is possible to mount a battery in the IC card, since the IC card is not able to be used once the battery runs out when outdoors or the like, the convenience of configuring the IC card in a small size so as to be convenient to carry is diminished.

Therefore, with IC cards, it is desirable for high-speed proximity communication to be able to be performed while receiving a supply of electrical power which is a power source from a RW.

In the IC card which performs low-speed proximity communication by FeliCa (registered trademark) or the like, it is possible to perform proximity communication with electrical power obtained from RF signals, as a power source, using the proximity communication.

However, since high-speed operations are demanded in the IC card which performs the high-speed proximity communication of TransferJet (registered trademark) or the like, the necessary electrical power is large compared to low-speed proximity communication, and thus, in the electrical power obtained from the RF signals using the proximity communication, it is difficult to obtain the electrical power which is necessary to perform high-speed proximity communication.

Therefore, in the IC card which performs high-speed proximity communication, it is necessary to receive a supply of electrical power to perform the high-speed proximity communication using a means, such as wireless electrical power transmission, of receiving a sufficient supply of electrical power to perform the high-speed proximity communication from the RW.

That is, in regard to the IC card which performs the high-speed proximity communication, in a case when a function of performing wireless electrical power transmission as well as the function of performing the high-speed proximity communication is mounted in the RW and, when the RW and the IC card are brought close, it is necessary to supply (transmit) electrical power for the IC card to perform the high-speed proximity communication using wireless electrical power transmission from the RW to the IC card.

As per above, in the case when the RW and the IC card are brought close, when electrical power is supplied to the IC card from the RW using wireless electrical power transmission, if a conductor such as a metallic clip or the like is interposed between the RW and the IC card, wireless electrical power transmission may be performed in the RW where electrical power is supplied which exceeds the electrical power which is necessary for the high-speed proximity communication of the IC card.

Then, unnecessary electrical power is consumed in the RW due to the performing of wireless electrical power transmission where electrical power is supplied which exceeds electrical power which is necessary for the high-speed proximity communication of the IC card.

According to the invention, it is possible to suppress unnecessary electrical power consumption in proximity communication.

A communication device according to a first embodiment of the invention is provided with a first master communication means which performs a first communication which is proximity communication at a first communication speed, a second master communication means which performs a second communication which is proximity communication at a second communication speed faster than the first communication speed, an electrical power transmission means where a slave communication device which receives a supply of electrical power to perform the second communication transmits electrical power to perform the second communication using wireless electrical power transmission, and a monitoring means which monitors the electrical power supplied to the slave communication device using wireless electrical power transmission, wherein the first master communication means receives configuration information including maximum electrical power consumption, which the slave communication device consumes in the second communication, from the slave communication device using the first communication, the electrical power transmission means begins wireless electrical power transmission after the first communication with the slave communication device begins, the second master communication means begins the second communication with the slave communication device after the wireless electrical power transmission has begun, and the electrical power transmission means stops the wireless electrical power transmission in a case when the electrical power monitored by the monitoring means exceeds a threshold set from the maximum electrical power consumption.

A communication method according to the first embodiment of the invention includes, in a communication device provided with a first master communication means which performs a first communication which is proximity communication at a first communication speed, a second master communication means which performs a second communication which is proximity communication at a second communication speed faster than the first communication speed, an electrical power transmission means where a slave communication device which receives a supply of electrical power to perform the second communication transmits electrical power to perform the second communication using wireless electrical power transmission, and a monitoring means which monitors the electrical power supplied to the slave communication device using wireless electrical power transmission, the steps of receiving configuration information including the maximum electrical power consumption, which the slave communication device consumes in the second communication, from the slave communication device using the first master communication means using the first communication, starting wireless electrical power transmission using the electrical power transmission means after the first communication with the slave communication device begins, starting the second communication with the slave communication device using the second master communication means after the wireless electrical power transmission has begun, and stopping wireless electrical power transmission using the electrical power transmission means in a case when electrical power monitored by the monitoring means exceeds a threshold set from the maximum electrical power consumption.

According to the first embodiment, the configuration information including the maximum electrical power consumption, which the slave communication device consumes in the second communication, is received from the slave communication device using the first communication and wireless electrical power transmission is begun after the first communication with the slave communication device begins. Then, the second communication is begun with the slave communication device after wireless electrical power transmission has begun. Wireless electrical power transmission is stopped in a case when electrical power supplied to the slave communication device exceeds a threshold set from the maximum electrical power consumption.

A communication device according to a second embodiment of the invention is provided with a first slave communication means which performs a first communication which is proximity communication at a first communication speed, a second slave communication means which performs a second communication which is proximity communication at a second communication speed faster than the first communication speed, and an electrical power reception means which receives electrical power to perform the second communication transmitted using wireless electrical power transmission from a master communication device which supplies electrical power to perform the second communication, wherein the first slave communication means transmits configuration information including the maximum electrical power consumption consumed in the second communication to the master communication device using the first communication, the electrical power reception means receives electrical power which begins being transmitted from the master communication device after the first communication with the master communication device begins, and the second slave communication means begins operating using the electrical power received by the electrical power reception means and begins the second communication with the master communication device.

A communication method according to the second embodiment of the invention includes, in a communication device provided with a first slave communication means which performs a first communication which is proximity communication at a first communication speed, a second slave communication means which performs a second communication which is proximity communication at a second communication speed faster than the first communication speed, and an electrical power reception means which receives electrical power to perform the second communication transmitted using wireless electrical power transmission from a master communication device which supplies electrical power to perform the second communication, the steps of transmitting configuration information including the maximum electrical power consumption consumed in the second communication to the master communication device using the first slave communication means using the first communication, receiving electrical power which begins being transmitted from the master communication device using the electrical power reception means after the first communication with the master communication device begins, and starting to operate using electrical power received by the electrical power reception means and starting the second communication with the master communication device using the second slave communication means.

According to the second embodiment, the configuration information including the maximum electrical power consumption consumed in the second communication is transmitted to the master communication device using the first communication, and the electrical power which begins being transmitted from the master communication device is received after the first communication with the master communication device begins. Then, operation is started using the electrical power, and the second communication with the master communication device is begun.

A communication system according to a third embodiment of the invention is provided with a master communication device which supplies electrical power and a slave communication device which receives a supply of electrical power, wherein the master communication device has a first master communication means which performs a first communication which is proximity communication at a first communication speed, a second master communication means which performs a second communication which is proximity communication at a second communication speed faster than the first communication speed, an electrical power transmission means where the slave communication device transmits electrical power to perform the second communication using wireless electrical power transmission, and a monitoring means which monitors the electrical power supplied to the slave communication device using wireless electrical power transmission, where the first master communication means receives configuration information including the maximum electrical power consumption, which the slave communication device consumes in the second communication, from the slave communication device using the first communication, the electrical power transmission means begins wireless electrical power transmission after the first communication with the slave communication device begins, the second master communication means begins the second communication with the slave communication device after wireless electrical power transmission has begun, and the electrical power transmission means stops wireless electrical power transmission in a case when the electrical power monitored by the monitoring means exceeds a threshold set from the maximum electrical power consumption, and wherein the slave communication device has a first slave communication means which performs the first communication, a second slave communication means which performs the second communication, and an electrical power reception means which receives electrical power to perform the second communication transmitted using wireless electrical power transmission from the master communication device, where the first slave communication means transmits configuration information including the maximum electrical power consumption consumed in the second communication to the master communication device using the first communication, the electrical power reception means receives electrical power which begins being transmitted from the master communication device after the first communication with the master communication device begins, and the second slave communication means begins operating using electrical power received by the electrical power reception means and begins the second communication with the master communication device.

A communication method according to the third embodiment of the invention includes, in a communication system provided with a master communication device which supplies electrical power and a slave communication device which receives a supply of electrical power, wherein the master communication device has a first master communication means which performs a first communication which is proximity communication at a first communication speed, a second master communication means which performs a second communication which is proximity communication at a second communication speed faster than the first communication speed, an electrical power transmission means where the slave communication device transmits electrical power to perform the second communication using wireless electrical power transmission, and a monitoring means which monitors electrical power supplied to the slave communication device using wireless electrical power transmission, and the slave communication device has a first slave communication means which performs the first communication, a second slave communication means which performs the second communication, and an electrical power reception means which receives electrical power to perform the second communication transmitted using wireless electrical power transmission from the master communication device, the steps of, in the master communication device, receiving configuration information including the maximum electrical power consumption, which the slave communication device consumes in the second communication, from the slave communication device using the first master communication means using the first communication, starting wireless electrical power transmission using the electrical power transmission means after the first communication with the slave communication device begins, starting the second communication with the slave communication device using the second master communication means after the wireless electrical power transmission has begun, and stopping the wireless electrical power transmission using the electrical power transmission means in a case when the electrical power monitored by the monitoring means exceeds a threshold set from the maximum electrical power consumption, and in the slave communication device, transmitting configuration information including the maximum electrical power consumption consumed in the second communication to the master communication device using the first slave communication means using the first communication, receiving electrical power which begins being transmitted from the master communication device using the electrical power reception means after the first communication with the master communication device begins, and starting to operate using the electrical power received by the electrical power reception means and starting the second communication with the master communication device using the second slave communication means.

According to the third embodiment, in the master communication device, the configuration information including the maximum electrical power consumption, which the slave communication device consumes in the second communication, is received from the slave communication device using the first communication and wireless electrical power transmission is begun after the first communication with the slave communication device begins. Then, the second communication is begun with the slave communication device after the wireless electrical power transmission has begun, but the wireless electrical power transmission is stopped in a case when the electrical power supplied to the slave communication device exceeds a threshold set from the maximum electrical power consumption. On the other hand, in the slave communication device, the configuration information including the maximum electrical power consumption consumed in the second communication is transmitted to the master communication device using the first communication, and electrical power which begins being transmitted from the master communication device is received after the first communication with the master communication device begins. Then, operation is started using the electrical power and the second communication with the master communication device is begun.

In addition, the communication device and the communication system may be an independent device or may be an internal block including one device.

According to the first to the third embodiments, it is possible to suppress unnecessary electrical power consumption in proximity communication.

DESCRIPTION OF THE PREFERRED EMBODIMENTS

Communication System According to an Embodiment of the Invention

Figure 1:
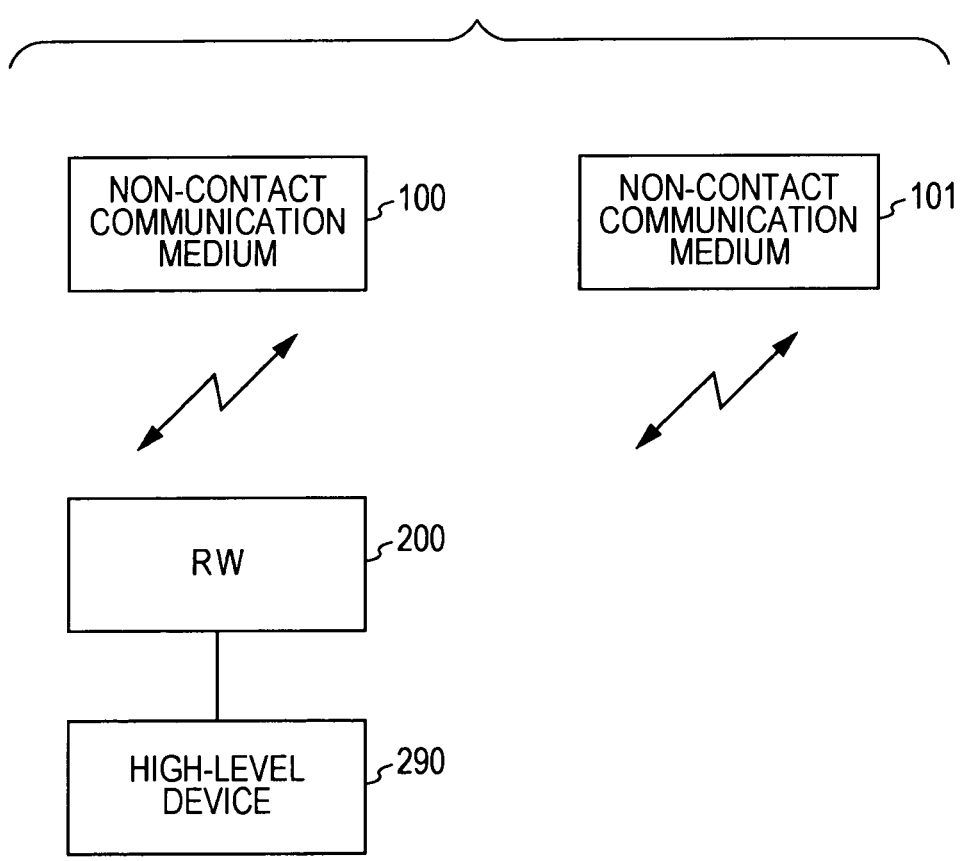
FIG. 1 is a block diagram illustrating a configuration example of a communication system according to an embodiment of the present invention.

FIG. 1 is a block diagram which shows a configuration example of a communication system (system refers to a logical collective of a plurality of devices and it does not matter whether each of the constituent devices are in the same housing or not) according to an embodiment of the invention.

In FIG. 1, the communication system has a non-contact communication medium 100 or 101, a RW 200, and a high-level device 290.

Each of the non-contact communication media 100 and 101 is, for example, a memory medium of a card type with a size of roughly a credit card which is currently in circulation, and performs data exchange with the RW 200 by performing proximity communication.

In addition, the non-contact communication media 100 and 101 are different in that, for example, the non-contact communication medium 101 is a model (referred to below as an old model) manufactured prior to the non-contact communication medium 100 and the non-contact communication medium 100 is a so-called new model (referred to below as a new model) where a portion of the non-contact communication medium 101 has been improved.

The RW 200 performs proximity communication with the non-contact communication media 100 and 101, and in accordance with the control from the high-level device 290, stores (writes) data onto the non-contact communication media 100 and 101 and reads data from the non-contact communication media 100 and 101.

The high-level device 290 is, for example, a device such as a PC (Personal Computer), a TV (Television Receiver), or a recorder that is able to provide or store (record) data such as contents such as images (still images or moving images), music or programs, and performs data exchange with the non-contact communication media 100 and 101 via the RW 200.

That is, the high-level device 290 controls the RW 200 and stores data on the non-contact communication media 100 and 101 or reads data from the non-contact communication media 100 and 101.

In the communication system configured as above, when the RW 200 (master communication device) is mounted on (connected to) the high-level device 290, wireless polling begins.

After that, when the non-contact communication media 100 or 101 is in a state of being brought close to the RW 200 such as by being held over the RW 200, the non-contact communication media 100 or 101 (slave communication device) in a state of being brought close to the RW 200 responds to the wireless polling from the RW 200, and according to this, the non-contact communication media 100 or 101 and the RW 200 begin proximity communication.

Then, in accordance with the control from the high-level device 290, the RW 200 stores (writes in) data such as the contents supplied from the high-level device 290 onto the non-contact communication media 100 or 101 or reads data such as the contents from the non-contact communication media 100 or 101 and supplies the data to the high-level device 290.

Configuration Example of Non-Contact Communication Medium 100

Figure 2:
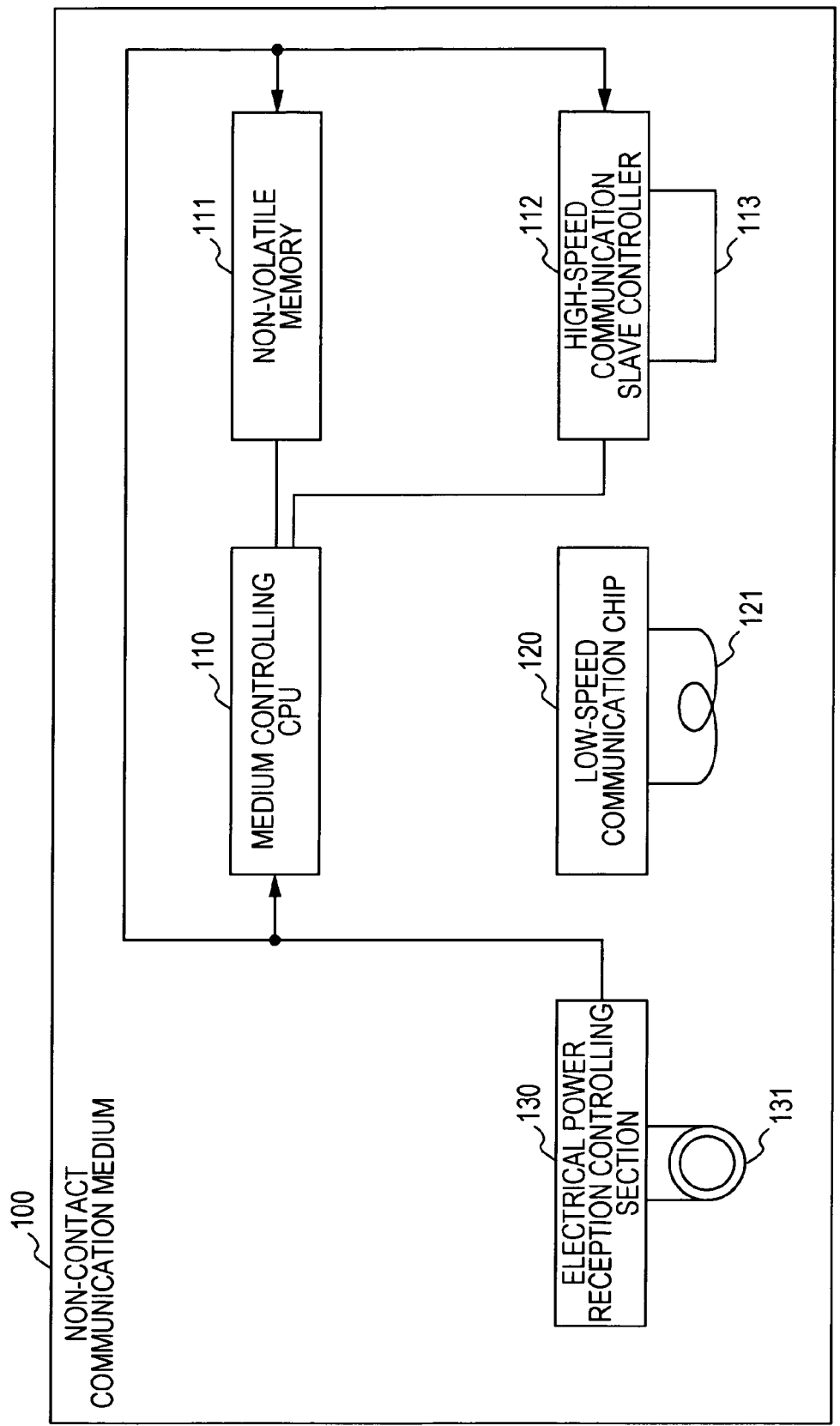
FIG. 2 is a block diagram illustrating a configuration example of hardware of a non-contact communication medium.

FIG. 2 is a block diagram which shows a configuration example of hardware of the non-contact communication medium 100 of FIG. 1.

The non-contact communication medium 100 functions as a slave communication device which receives electrical power sent by wireless electrical power transmission for wirelessly performing proximity communication which is high-speed communication described later with the RW 200.

The non-contact communication medium 100 has a medium controlling CPU (Central Processing Unit) 110, a non-volatile memory 111, a high-speed communication slave controller 112, a high-speed communication antenna 113, a low-speed communication chip 120, a low-speed communication antenna 121, an electrical power reception controlling section 130, and an electrical power reception antenna 131.

The medium controlling CPU 110 is connected to the non-volatile memory 111 and the high-speed communication slave controller 112 via a bus and controls the non-volatile memory 111 and the high-speed communication slave controller 112.

The non-volatile memory 111 is, for example, a NAND flash memory with a large capacity (for example, 6 gigabytes or 8 gigabytes), and in accordance with the control from the medium controlling CPU 110, the non-volatile memory 111 stores data such as contents supplied from the medium controlling CPU 110 or reads stored data and supplies the data to the medium controlling CPU 110.

The high-speed communication slave controller 112 is connected to the high-speed communication antenna 113 and functions as a second slave communication means which performs wireless proximity communication (second communication) (referred to below as high-speed communication) with the RW 200 via the high-speed communication antenna 113 at a communication speed (second communication speed) faster than the communication speed (first communication speed) of the low-speed communication chip 120 described later.

Here, as the communication method of the high-speed communication performed between the high-speed communication slave controller 112 and the RW 200, it is possible to adopt, for example, TransferJet (registered trademark) which is able to perform high-speed proximity communication. Also, as the communication method of the high-speed communication, it is possible to adopt, for example, a communication method which complies with high-speed wireless communication standards such as wireless LAN, wireless USB (Universal Serial Bus), or Bluetooth (registered trademark).

In addition, in the present embodiment, TransferJet (registered trademark) is adopted as the communication method of the high-speed communication, and accordingly, in high-speed communication, it is set so that proximity communication at a communication speed of a maximum of 560 Mbps is performed by a 4.48 GHz carrier.

The low-speed communication chip 120 is connected to the low-speed communication antenna 121 and functions as a first slave communication means which performs wireless proximity communication (first communication) with the RW 200 via the low-speed communication antenna 121 at a predetermined communication speed (first communication speed).

Here, the proximity communication performed between the low-speed communication chip 120 and the RW 200 is communication (referred to below as low-speed communication) at a communication speed slower than the communication speed of the high-speed communication performed by the high-speed communication slave controller 112. As the communication method, it is possible to adopt, for example, FeliCa (registered trademark) which is able to perform proximity communication at a predetermined communication speed. Also, as the communication method of the low-speed communication, it is possible to adopt, for example, a communication method (for example, type A or type B) which complies with wireless communication standards such as NFC.

In addition, in the present embodiment, FeliCa (registered trademark) is adopted as the communication method of the low-speed communication, and accordingly, in low-speed communication, it is set so that proximity communication at a communication speed of 212 kbps is performed by a 13.56 MHz carrier. That is, as the low-speed communication chip 120, it is set so that an IC chip is adopted which performs FeliCa (registered trademark) proximity communication and has tamper resistance.

Additionally, in a case when FeliCa (registered trademark) is adopted as the communication method of the low-speed communication, as the low-speed communication, secure communication is possible and it is possible to perform mutual authentication and perform secure communication.

Here, as per above, the proximity communication (low-speed communication) performed by the low-speed communication chip 120 is a speed slower than the proximity communication (high-speed communication) performed by the high-speed communication slave controller 112, but in the low-speed communication chip 120 which performs low-speed proximity communication such as this, high-speed operations are not demanded.

Accordingly, the electrical power necessary for the operations of the low-speed communication chip 120 (electrical power necessary for low-speed communication) is small compared to the electrical power necessary for the operations of the high-speed communication slave controller 112 (electrical power necessary for high-speed communication).

For example, as described above, in a case when FeliCa (registered trademark) is adopted as the communication method of the low-speed communication and TransferJet (registered trademark) is adopted as the communication method of the high-speed communication, the electrical power necessary for the communication by FeliCa (registered trademark) is electrical power approximately two-digits smaller than the electrical power necessary for the communication by TransferJet (registered trademark).

As per above, since the electrical power necessary for the low-speed communication is small, the low-speed communication chip 120 is operated by using electrical power, which is obtained from the RF signals for low-speed communication from the RW 200 received by the low-speed communication antenna 121, as a power source and performs low-speed communication.

The electrical power reception controlling section 130 is connected to the electrical power reception antenna 131, receives electrical power for performing high-speed communication sent by wireless electrical power transmission from the RW 200 via the electrical power reception antenna 131, and supplies the electrical power to the medium controlling CPU 110, the non-volatile memory 111, and the high-speed communication slave controller 112.

Here, as per above, the medium controlling CPU 110, the non-volatile memory 111, and the high-speed communication slave controller 112 operate with electrical power supplied by the electrical power reception controlling section 130 as a power source and perform high-speed communication.

In addition, as the transmission method of the wireless electrical power transmission performed between the electrical power reception controlling section 130 and the RW 200, it is possible to adopt, for example, electromagnetic induction. Additionally, as the transmission method of the wireless electrical power transmission, it is also possible to adopt, for example, a wireless electrical power transmission method such as magnetic resonance.

Compared to the wireless electrical power transmission using magnetic resonance, the wireless electrical power transmission using electromagnetic induction has better transmission efficiency of electrical power but is easily affected by positional deviation of the antennas (positional deviation of the antenna sending electrical power and the antenna receiving electrical power). On the other hand, compared to the wireless electrical power transmission using electromagnetic induction, the wireless electrical power transmission using magnetic resonance is hardly affected by positional deviation of the antennas but has inferior transmission efficiency of electrical power.

Here, in the non-contact communication medium 100, the medium controlling CPU (Central Processing Unit) 110, the non-volatile memory 111, the high-speed communication slave controller 112, and the electrical power reception controlling section 130 operate by electrical power sent (transmitted) by wireless electrical power transmission by the RW 200, and the low-speed communication chip 120 operates by electrical power obtained from the RF signals for low-speed communication from the RW 200.

As a result, it is possible for the non-contact communication medium 100 not to have a power source (battery) and to be configured as a card type (small size) with roughly the same size of an IC card (or IC chip) as an electronic commuter ticket, electronic money or the like.

Figure 3:
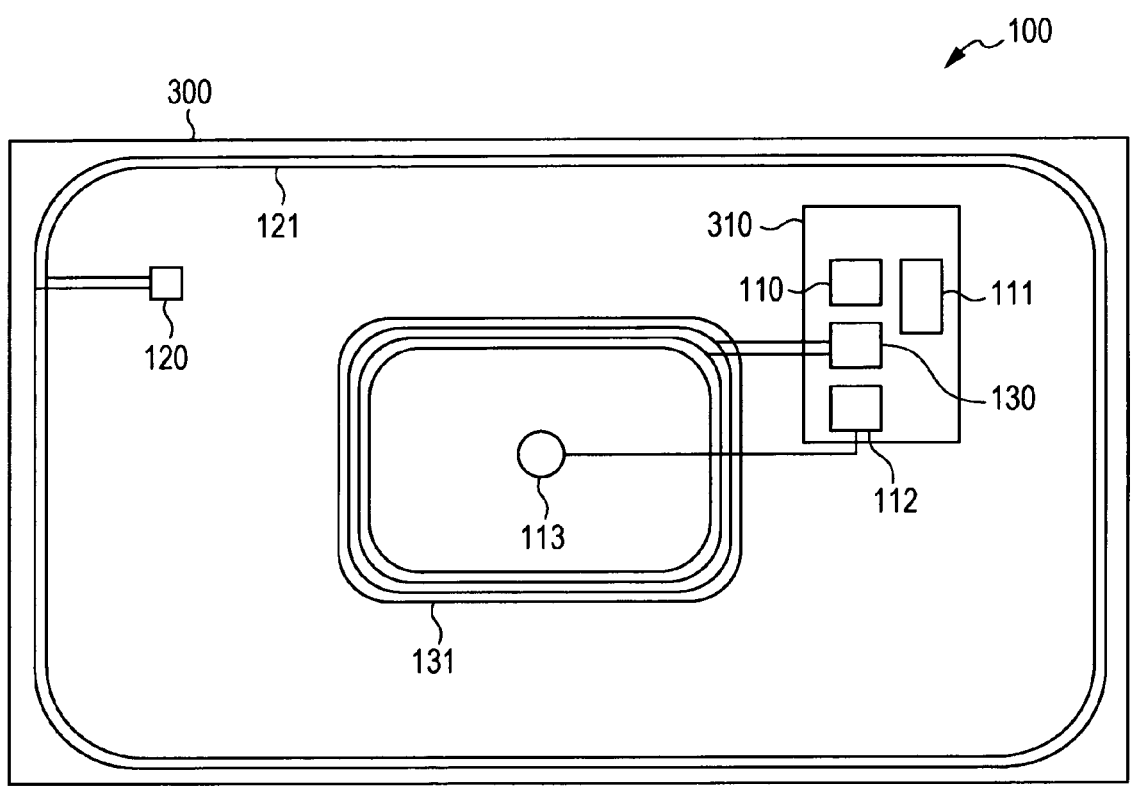
FIG. 3 is a planar diagram illustrating a physical configuration example of the non-contact communication medium.

FIG. 3 is a planar diagram which shows a physical configuration example of the non-contact communication medium 100 of FIG. 2.

The non-contact communication medium 100 is bonded with a card base member 300 with a substantially rectangular shape and a member (not shown) with a shape which is the same as the card base member 300, and is configured in a card form with roughly the size of a credit card.

In the card base member 300, the high-speed communication antenna 113, the low-speed communication chip 120, the low-speed communication antenna 121, the electrical power reception antenna 131, and a medium controlling substrate 310 are disposed as shown in FIG. 3.

In the medium controlling substrate 310, the medium controlling CPU 110, the non-volatile memory 111, the high-speed communication slave controller 112, and the electrical power reception controlling section 130 are disposed.

In addition, as shown in FIG. 3, the low-speed communication antenna 121 is disposed in a coil shape in an inner side portion of the outer periphery of the card base portion 300 and is connected to the low-speed communication chip 120, and the low-speed communication chip 120 operates independently from each block disposed in the medium controlling substrate 310.

Additionally, in a central portion of the card base member 300, the high-speed communication antenna 113 and the electrical power reception antenna 131 with a coil shape are disposed as shown in FIG. 3.

By disposing the high-speed communication antenna 113, the low-speed communication antenna 121, and the electrical power reception antenna 131 as per above, it is possible to perform low-speed communication, high-speed communication, and wireless electrical power transmission between the non-contact communication medium 100 and the RW 200 even if the non-contact communication medium 100 is held over the RW 200 with either side of the front side (for example, a card upper member 400 side) or the rear side (for example, the card base member 300) facing the RW 200.

Configuration Example of Non-Contact Communication Medium 101

Figure 4:
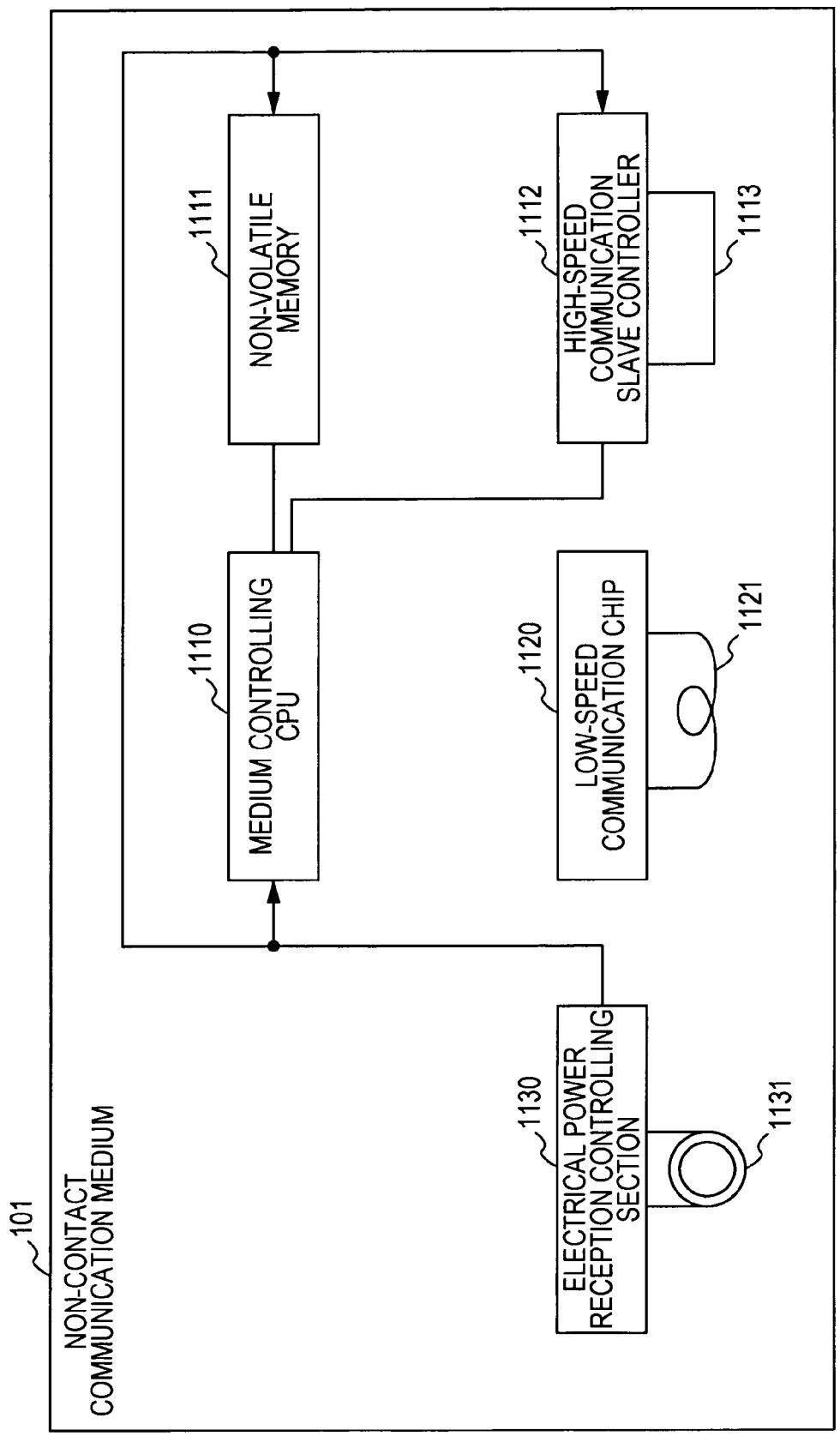
FIG. 4 is a block diagram illustrating a configuration example of hardware of a non-contact communication medium.

FIG. 4 is a block diagram which shows a configuration example of hardware of the non-contact communication medium 101 of FIG. 1.

The non-contact communication medium 101 functions as a slave communication device which receives electrical power sent by wireless electrical power transmission for performing high-speed communication with the RW 200 in the same manner as the non-contact communication medium 100.

The non-contact communication medium 101 has a medium controlling CPU 1110, a non-volatile memory 1111, a high-speed communication slave controller 1112, a high-speed communication antenna 1113, a low-speed communication chip 1120, a low-speed communication antenna 1121, an electrical power reception controlling section 1130, and an electrical power reception antenna 1131.

From the medium controlling CPU 1110 to the electrical power reception antenna 1131 are respectively configured in the same manner as from the medium controlling CPU 110 to the electrical power reception antenna 131 of the non-contact communication medium 100 of FIG. 2.

In addition, as described above, the non-contact communication medium 101 is an old model, and out of the medium controlling CPU 1110 to the electrical power reception antenna 1131, an improved one or more of the high-speed communication slave controller 1112, the high-speed communication antenna 1113, the electrical power reception controlling section 1130, and the electrical power reception antenna 1131 is the high-speed communication slave controller 112, the high-speed communication antenna 113, the electrical power reception controlling section 130, or the electrical power reception antenna 131 of the non-contact communication medium 100 (FIGS. 2 and 3) which is a new model.

Figure 5:
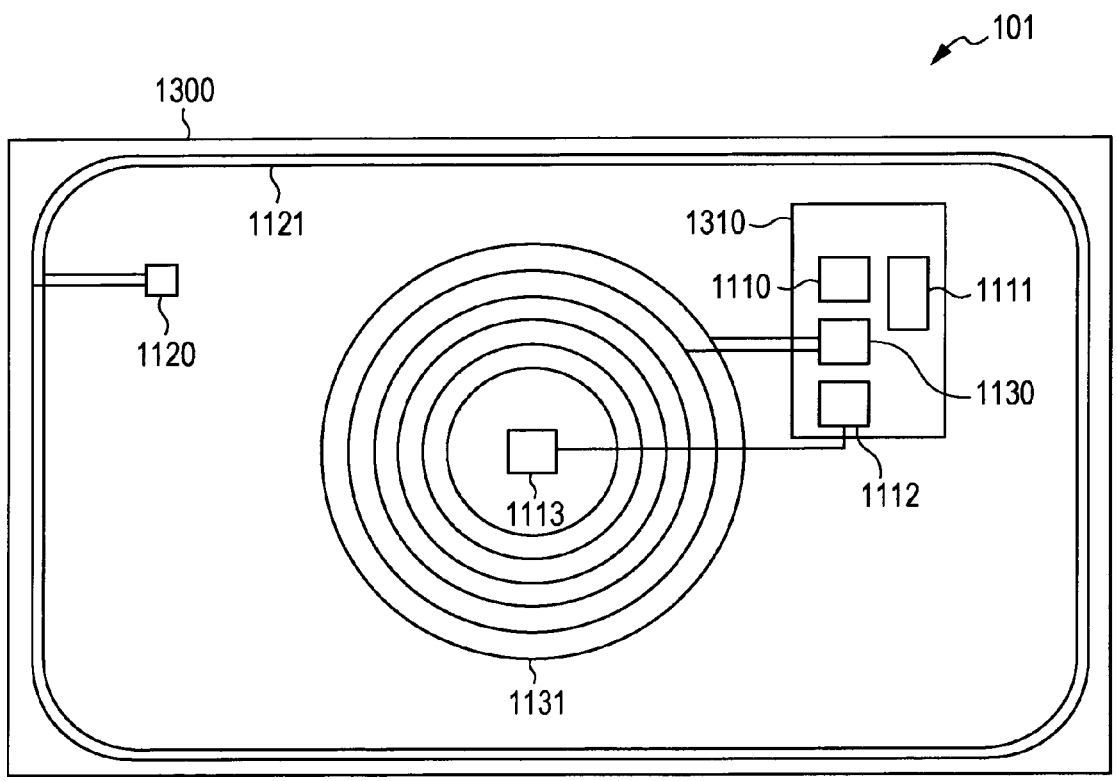
FIG. 5 is a planar diagram illustrating a physical configuration example of the non-contact communication medium.

FIG. 5 is a planar diagram which shows a physical configuration example of the non-contact communication medium 101 of FIG. 4.

The non-contact communication medium 101 is bonded with a card base member 1300 with a substantially rectangular shape and a member (not shown) with a shape which is the same as the card base member 1300, and is configured in a card form with roughly the size of a credit card in the same manner as the non-contact communication medium 100.

In the card base member 1300, the high-speed communication antenna 1113, the low-speed communication chip 1120, the low-speed communication antenna 1121, the electrical power reception antenna 1131, and a medium controlling substrate 1310 are disposed as shown in FIG. 5.

In the medium controlling substrate 1310, the medium controlling CPU 1110, the non-volatile memory 1111, the high-speed communication slave controller 1112, and the electrical power reception controlling section 1130 are disposed.

In addition, as shown in FIG. 5, the low-speed communication antenna 1121 is disposed in a coil shape in an inner side portion of the outer periphery of the card base portion 1300 and is connected to the low-speed communication chip 1120, and the low-speed communication chip 1120 operates independently from each block disposed in the medium controlling substrate 1310.

Additionally, in a central portion of the card base member 1300, the high-speed communication antenna 1113 and the electrical power reception antenna 1131 with a coil shape are disposed as shown in FIG. 5.

As per above, the non-contact communication medium 101 which is the old model is configured in the same manner as the non-contact communication medium 100 shown in FIG. 3 which is the new model.

However, in the non-contact communication medium 100 of FIG. 3 (and FIG. 2) which is the new model, for example, the high-speed communication slave controller 112, the high-speed communication antenna 113, the electrical power reception controlling section 130, and the electrical power reception antenna 131 are respective improvements of the high-speed communication slave controller 1112, the high-speed communication antenna 1113, the electrical power reception controlling section 1130, and the electrical power reception antenna 1131 of the non-contact communication medium 101 of FIG. 5 (and FIG. 4) which is the old model.

Configuration Example of RW 200

Figure 6:
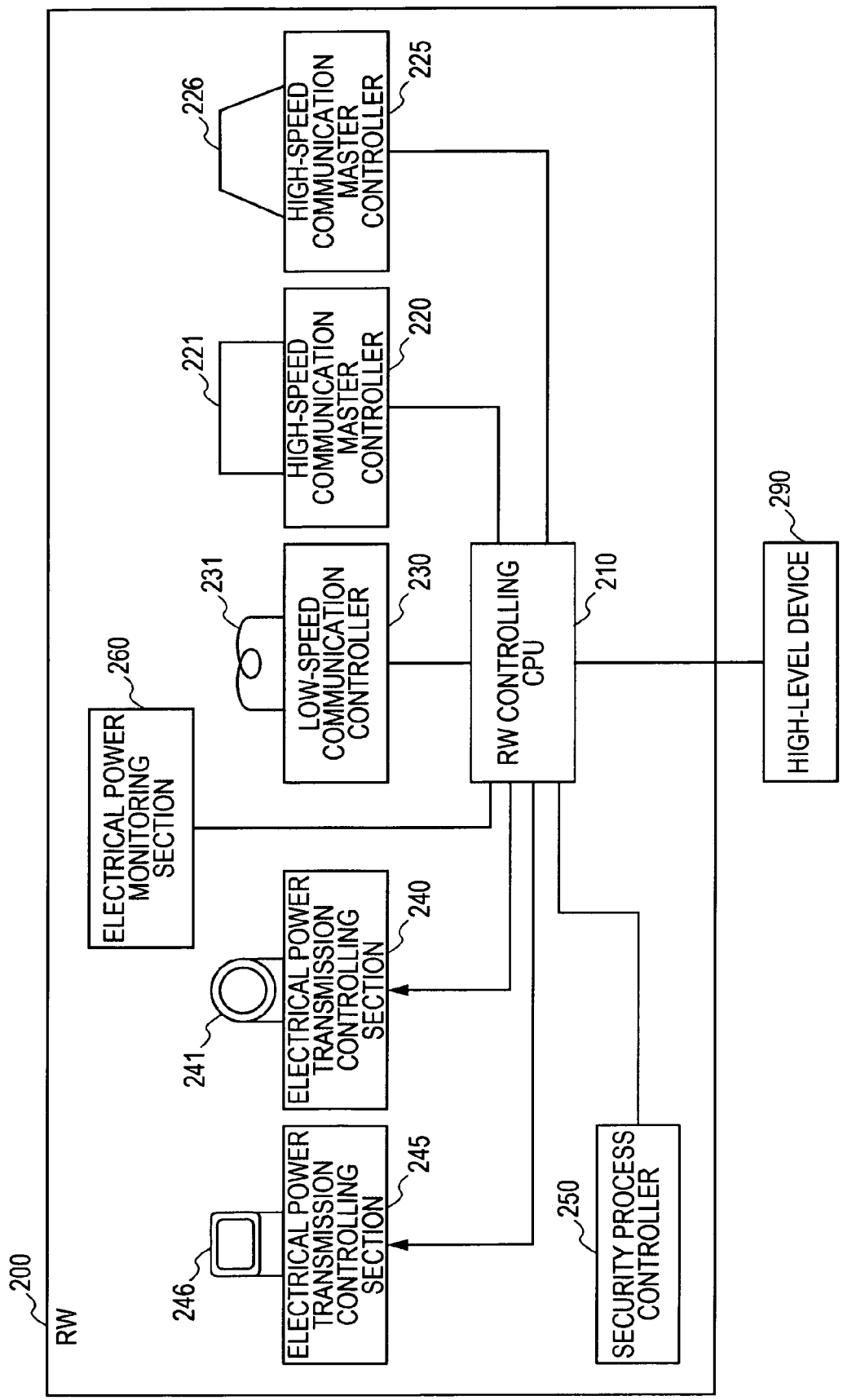
FIG. 6 is a block diagram illustrating a configuration example of hardware of a RW.

FIG. 6 is a block diagram which shows a configuration example of hardware of the RW 200 of FIG. 1.

The RW 200 functions as a master communication device which sends electrical power for the non-contact communication medium 100 or 101 to perform high-speed communication by wireless electrical power transmission.

The RW 200 has a RW controlling CPU 210, a high-speed communication master controller 220, a high-speed communication antenna 221, a high-speed communication master controller 225, a high-speed communication antenna 226, a low-speed communication controller 230, a low-speed communication antenna 231, an electrical power transmission controlling section 240, an electrical power transmission antenna 241, an electrical power transmission controlling section 245, an electrical power transmission antenna 246, a security process controller 250, and an electrical power monitoring section 260.

The RW controlling CPU 210 is connected to the high-level device 290 via, for example, a predetermined bus such as a USB.

Furthermore, the RW controlling CPU 210 is connected to the high-speed communication master controllers 220 and 225, the low-speed communication controller 230, the security process controller 250, and the electrical power monitoring section 260 via a bus, and in accordance with the control from the high-level device 290 and the like, controls the high-speed communication master controllers 220 and 225, the low-speed communication controller 230, the security process controller 250, and the electrical power monitoring section 260.

Additionally, the RW controlling CPU 210 is connected to each of the electrical power transmission controlling sections 240 and 245 by one general-use I/O (Input/Output) (Interface), and in accordance with information supplied from the electrical power monitoring section 260 and the like, controls the electrical power transmission controlling sections 240 and 245.

The high-speed communication master controller 220 is connected to the high-speed communication antenna 221, and functions as a second master communication means which wirelessly performs high-speed communication with the high-speed communication slave controller 112 of the non-contact communication medium 100 (FIG. 2) which is the new model via the high-speed communication antenna 221.

The high-speed communication master controller 225 is connected to the high-speed communication antenna 226, and functions as a second master communication means which wirelessly performs high-speed communication with the high-speed communication slave controller 1112 of the non-contact communication medium 101 (FIG. 4) which is the old model via the high-speed communication antenna 226.

Accordingly, the high-speed communication master controller 220 and the high-speed communication antenna 221 support the new model, and the high-speed communication master controller 225 and the high-speed communication antenna 226 support the old model.

The low-speed communication controller 230 is connected to the low-speed communication antenna 231, and functions as a first master communication means which wirelessly performs low-speed communication with the low-speed communication chip 120 of the non-contact communication medium 100 (FIG. 2) and the low-speed communication chip 1120 of the non-contact communication medium 101 (FIG. 4) via the low-speed communication antenna 231.

That is, the low-speed communication controller 230 outputs RF signals from the low-speed communication antenna 231 and applies polling.

On the other hand, when (the low-speed communication antenna 121 (FIG. 2) of) the non-contact communication medium 100 is brought close to (the low-speed communication antenna 231 of) the RW 200 by, for example, the non-contact communication medium 100 which is the new model being held over the RW 200, the low-speed communication chip 120 of the non-contact communication medium 100 (FIG. 2) returns a response which responds to the polling from the low-speed communication controller 230 of the RW 200 (sent by load modulation).

The low-speed communication controller 230 of the RW 200 receives the response from the low-speed communication chip 120 of the non-contact communication medium 100, and notifies the RW controlling CPU 210 of the reception of the response. According to this, the RW controlling CPU 210 recognizes that the non-contact communication medium 100 has been brought close to the RW 200.

Also in a case when the non-contact communication medium 101 which is the old model is brought close to the RW 200, a similar process is performed in the non-contact communication medium 101 and the RW 200, and the RW controlling CPU 210 recognizes that the non-contact communication medium 101 has been brought close to the RW 200.

Here, in the case when, for example, FeliCa (registered trademark) is adopted as the communication method of the low-speed communication, a FeliCa (registered trademark) RW is adopted as the low-speed communication controller 230.

The electrical power transmission controlling section 240 is connected to the electrical power transmission antenna 241 and sends the electrical power necessary for the non-contact communication medium 100 (FIG. 2) which is the new model to perform high-speed communication via the electrical power transmission antenna 241 by wireless electrical power transmission.

The electrical power transmission controlling section 245 is connected to the electrical power transmission antenna 246 and sends the electrical power necessary for the non-contact communication medium 101 (FIG. 4) which is the old model to perform high-speed communication via the electrical power transmission antenna 246 by wireless electrical power transmission.

Accordingly, the electrical power transmission controlling section 240 and the electrical power transmission antenna 241 support the new model and the electrical power transmission controlling section 245 and the electrical power transmission antenna 246 support the old model.

The security process controller 250 has tamper resistance and performs a security process which is necessary for the low-speed communication controller 230 to perform low-speed communication such as a process of encrypting the communication path.

Here, in the case when, for example, FeliCa (registered trademark) is adopted as the communication method of the low-speed communication as described above, a security chip which performs a FeliCa (registered trademark) security process is adopted as the security process controller 250.

Additionally, the electrical power necessary for the RW 200 to operate is supplied to the RW 200 from the high-level device 290 or a power source (not shown).

In addition, the high-speed communication master controller 220 and the high-speed communication antenna 221 which support the new model may have the respective functions of the high-speed communication master controller 225 and the high-speed communication antenna 226 which support the old model, and accordingly, in a case of there being backward compatibility, it is possible for the RW 200 to be configured without providing the high-speed communication master controller 225 and the high-speed communication antenna 226 which support the old model.

In the same manner, electrical power transmission controlling section 240 and the electrical power transmission antenna 241 which support the new model may have the respective functions of the electrical power transmission controlling section 245 and the electrical power transmission antenna 246 which support the old model, and accordingly, in the case of there being backward compatibility, it is possible for the RW 200 to be configured without providing the electrical power transmission controlling section 245 and the electrical power transmission antenna 246 which support the old model.

In accordance with the control of the RW controlling CPU 210, the electrical power monitoring section 260 monitors the electrical power supplied to the non-contact communication media 100 or 101 (a supply of electrical power received by the non-contact communication media 100 or 101) by wireless electrical power transmission performed by the electrical power transmission controlling sections 240 or 245.

In addition, in a case when the electrical power supplied by wireless electrical power transmission exceeds a predetermined amount of electrical power which is a threshold, the electrical power monitoring section 260 supplies the information that the threshold to the RW controlling CPU 210 has been exceeded.

Medium Configuration Information

Figure 7:
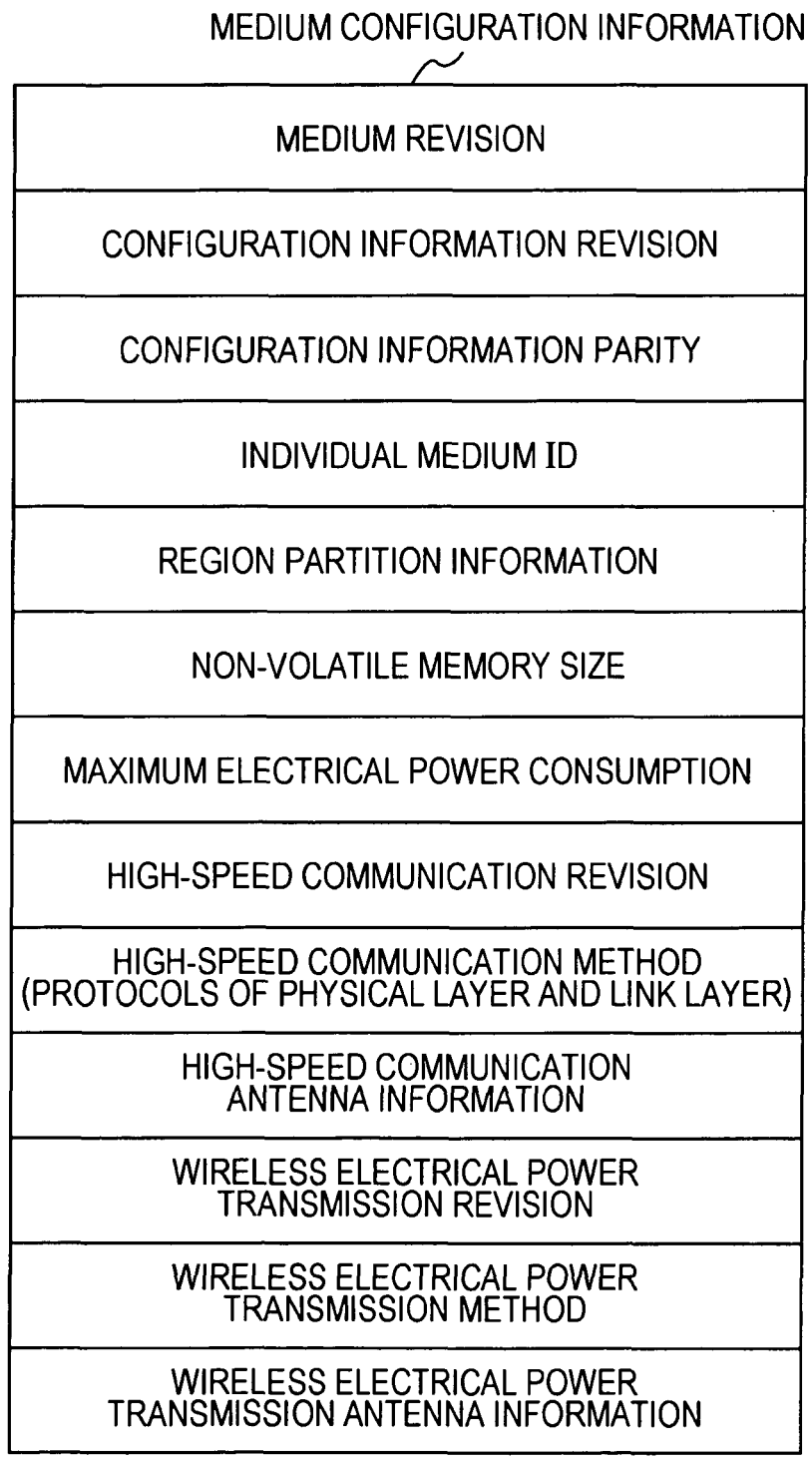
FIG. 7 is a diagram illustrating an example of a data configuration of medium configuration information.

FIG. 7 is a diagram which shows an example of a data configuration of medium configuration information.

Here, medium configuration information is information relating to the non-contact communication media 100 and 101 such as the configuration and the functions of the non-contact communication media 100 and 101. The medium configuration information of the non-contact communication medium 100 is stored in the non-contact communication medium 100 and the medium configuration information of the non-contact communication medium 101 is stored in the non-contact communication medium 101.

In the non-contact communication medium 100, the medium configuration information is stored in a memory (non-volatile memory) (not shown) which has the low-speed communication chip 120 (FIG. 2) with tamper resistance built in. Also in the non-contact communication medium 101, in the same manner, the medium configuration information is stored in a memory (non-volatile memory) (not shown) which has the low-speed communication chip 1120 (FIG. 4) with tamper resistance built in.

The medium configuration information includes medium revision, configuration information revision, configuration information parity, individual medium IDs, region partition information, non-volatile memory size, maximum electrical power consumption, high-speed communication revision, high-speed communication method, high-speed communication antenna information, wireless electrical power transmission revision, wireless electrical power transmission method, wireless electrical power transmission antenna information, and the like as shown in FIG. 7.

For example, in the medium configuration information stored in the low-speed communication chip 120 (FIG. 2) of the non-contact communication medium 100, the medium revision represents a revision number of the non-contact communication medium 100.

The configuration information revision represents a revision number of the medium configuration information.

The value of the medium revision increases each time there is a modification in the non-contact communication medium 100, and the value of the configuration information revision increases each time there is a modification in the medium configuration information.

The configuration information parity is the parity of the overall medium configuration information and is used for checking the validity of the medium configuration information.

The individual medium IDs are unique IDs allocated to the non-contact communication mediums 100, and as the individual medium IDs, it is possible to adopt a 128 bit GUID (Globally Unique Identifier) or the like.

The region partition information represents how to partition the memory region of the non-volatile memory 111 (FIG. 2) of the non-contact communication medium 100.

That is, it is possible to partition and use the memory region of the non-volatile memory 111 as memory regions of each type of characteristics of a memory region where plain text data is stored, a memory region where encrypted data is stored in which plain text data has been encrypted, a protected contents region where protected contents are stored which are contents protected by DRMs (Digital Rights Management) such as AACS (Advanced Access Content System), and the like.

In the region partition information, information and the like is included for specifying each of the memory region characteristics for the case when the memory region of the non-volatile memory 111 is partitioned into each of the memory region characteristics.

The non-volatile memory size represents the total capacity of the non-volatile memory 111.

The maximum electrical power consumption represents the maximum electrical power consumed when the non-contact communication medium 100 is performing high-speed communication.

The high-speed communication revision represents a revision number of the high-speed communication performed by the non-contact communication medium 100.

The high-speed communication method represents the protocols of the physical layer and the link layer of the communication method of the high-speed communication performed by the non-contact communication medium 100.

Here, as the communication method of the high-speed communication, it is possible to adopt TransferJet, wireless USB, Bluetooth, or the like as described above.

The high-speed communication antenna information is information relating to the high-speed communication antenna 113 (FIG. 2) of the non-contact communication medium 100 and includes the arrangement state of the high-speed communication antenna 113. Here, in the arrangement state of the high-speed communication antenna 113, the position on (the card base member 300 (FIG. 3) of) the non-contact communication medium 100 where the high-speed communication antenna 113 is arranged, and the shape of the high-speed communication antenna 113 are included.

The wireless electrical power transmission revision represents a revision number of the wireless electrical power transmission of which a supply of electrical power is able to be received by the non-contact communication medium 100 (wireless electrical power transmission supporting the non-contact communication medium 100).

The wireless electrical power transmission method represents a method of wireless electrical power transmission of which a supply of electrical power is able to be received by the non-contact communication medium 100, and includes information on whether the wireless electrical power transmission is electromagnetic induction, magnetic resonance, or the like.

The wireless electrical power transmission antenna information is information relating to the electrical power reception antenna 131 (FIG. 2) of the non-contact communication medium 100 and includes the arrangement state of the electrical power reception antenna 131.

The medium configuration information as per above is stored in a memory which is built in to the low-speed communication chip 120 of the non-contact communication medium 100 as described above.

In addition, in the low-speed communication performed between the low-speed communication chip 120 of the non-contact communication medium 100 and the low-speed communication controller 230 of the RW 200 when the non-contact communication medium 100 and the RW 200 are brought close, the non-contact communication medium 100 sends the medium configuration information and the RW 200 receives the medium configuration information of the non-contact communication medium 100 sent from the non-contact communication medium 100.

In addition, it is possible to prevent falsification of the medium configuration information by adopting an IC chip with tamper resistance as the low-speed communication chip 120 as described above.

Figure 8:
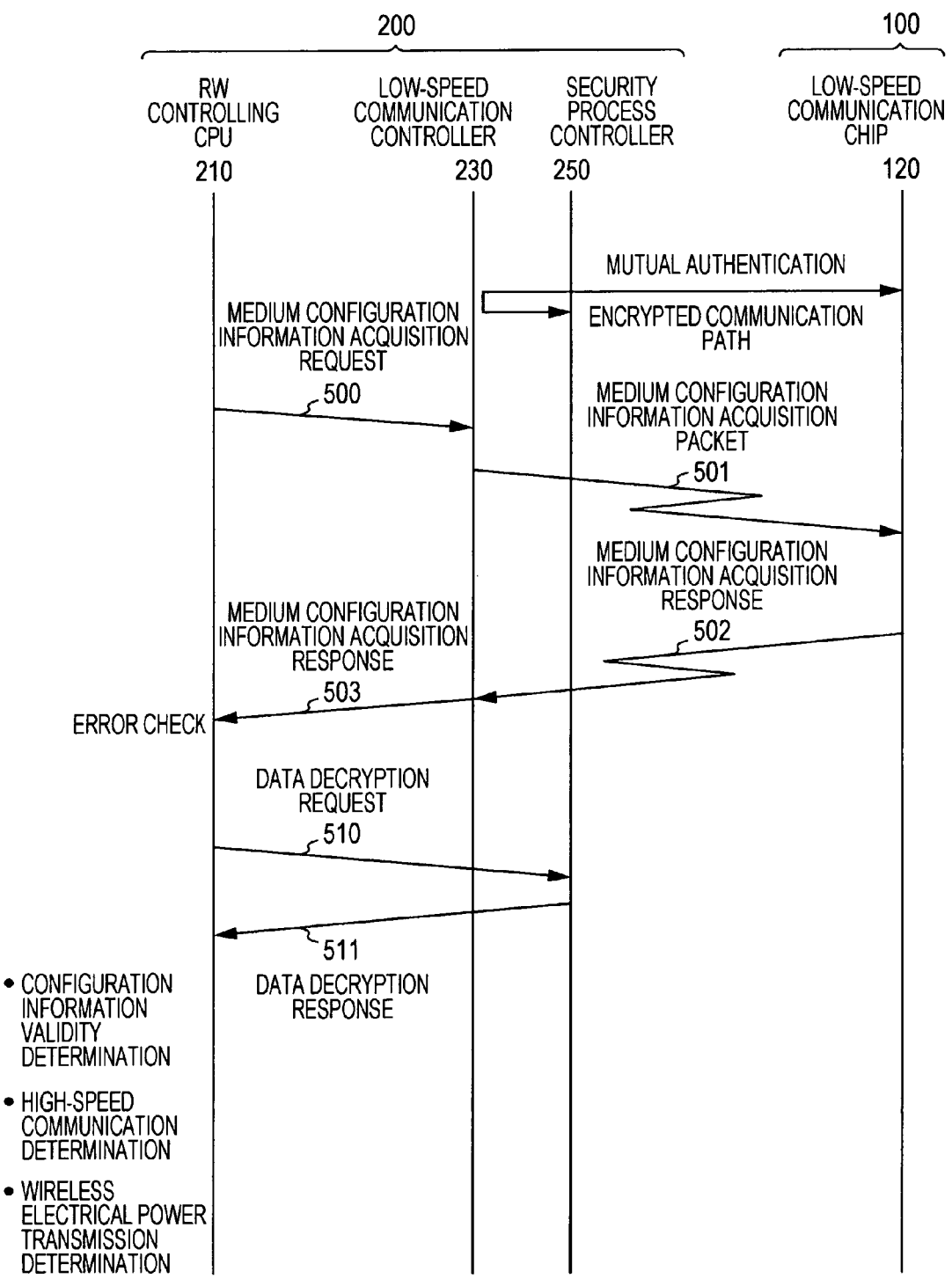
FIG. 8 is a diagram describing processing by the non-contact communication medium and the RW when the non-contact communication medium is brought close to the RW.

Processing by Non-Contact Communication Medium 100 and RW200 when Non-Contact Communication Medium 100 and RW200 are Brought Close FIG. 8 is a diagram describing processing by the non-contact communication medium 100 and the RW 200 when, for example, the non-contact communication medium 100, which is the new model out of the non-contact communication medium 100 which is the new model and the non-contact communication medium 101 which is the old model, is brought close to the RW 200 by being held over the RW 200 or the like.

Here, it is set so that the high-level device 290 and the RW 200 are already connected and the high-level device 290 normally recognizes the RW 200 (as an external device which is able to be controlled).

The RW controlling CPU 210 of the RW 200 (FIG. 6) is in a medium waiting state waiting for the non-contact communication media 100 or 101 to be brought close by being held thereover when normally recognized by the high-level device 290.

In the medium waiting state, the RW controlling CPU 210 controls the low-speed communication controller 230 and begins output of the low-speed communication RF signals (low-speed communication carrier) via the low-speed communication antenna 231.

Furthermore, the RW controlling CPU 210 controls the low-speed communication controller 230 and low-speed communication polling is performed.

When the non-contact communication media 100 or 101 are not in a state of being brought close to the RW 200, the response to the low-speed communication polling is not returned.

In the case when the response to the low-speed communication polling is not returned, the low-speed communication controller 230 repeats the low-speed communication polling periodically.

After that, when the non-contact communication medium 100, which is the new model out of the non-contact communication medium 100 which is the new model and the non-contact communication medium 101 which is the old model, is held over the RW 200 and the non-contact communication medium 100 and the RW 200 are brought close, the low-speed communication chip 120 of the non-contact communication medium 100 (FIG. 2) receives the low-speed communication polling from the RW 200 and returns a response to the low-speed communication polling via the low-speed communication antenna 121.

The low-speed communication controller 230 of the RW 200 (FIG. 6) receives the response to the polling from the low-speed communication chip 120 of the non-contact communication medium 100, and according to the reception of the response, sends a notification (referred to below as a proximity notification) to the RW controlling CPU 210 that the non-contact communication media 100 or 101 or the like (which are communication devices capable of low-speed communication) has been brought close.

The RW controlling CPU 210 requests mutual authentication to the security process controller 250 when a proximity notification is sent from the low-speed communication controller 230.

The security process controller 250 controls the low-speed communication controller 230 responding to the request for mutual authentication from the RW controlling CPU 210, and according to this, a (data exchange for) mutual authentication adopted by, for example, FeliCa (registered trademark) is performed between the low-speed communication chip 120 of the non-contact communication medium 100 and the low-speed communication controller 230 of the RW 200 as shown in FIG. 8.

Then, only when the mutual authentication is successful, the subsequent processing is performed, and when the mutual authentication fails, the subsequent processing is not performed.

As per above, by performing mutual authentication, it is possible to prevent fraudulent devices which falsely act as the non-contact communication medium 100 (or 101) or the RW 200 and fraudulent exchanges of data such as contents of the non-contact communication medium 100 (or 101) or with the RW 200 using high-speed communication.

When mutual authentication is successful, in the non-contact communication medium 100 and the RW 200, the communication path is encrypted, that is, an encryption key is obtained for encrypting data and the communication path where the data encrypted with the encryption key is exchanged (referred to below as an encrypted communication path) is confirmed (formed) between the low-speed communication chip 120 of the non-contact communication medium 100 and the low-speed communication controller 230 (or the security process controller 250) of the RW 200. Thus, it is possible to perform secure low-speed communication between the non-contact communication medium 100 and the RW 200 via the encrypted communication path.

When mutual authentication is successful, the RW controlling CPU 210 sends a medium configuration information acquisition request 500 which requests medium configuration information to the low-speed communication controller 230.

The low-speed communication controller 230 receives medium configuration information acquisition request 500 from the RW controlling CPU 210 and sends a medium configuration information acquisition packet 501 with the same content as the medium configuration information acquisition request 500 by low-speed communication.

The medium configuration information acquisition packet 501 sent by the low-speed communication controller 230 is received by the low-speed communication chip 120 (FIG. 2) of the non-contact communication medium 100 which is in a state of being brought close to the RW 200.

When the medium configuration information acquisition packet 501 from the low-speed communication controller 230 is received, the low-speed communication chip 120 of the non-contact communication medium 100 (FIG. 2) reads out the medium configuration information stored in the memory built into the low-speed communication chip 120 (the medium configuration information of the non-contact communication medium 100).

In addition, in a case when any abnormality is generated such as a failure in the reading out of the medium configuration information, the low-speed communication chip 120 returns an error (notification of an occurrence thereof) as a medium configuration information acquisition response 502, which is a response corresponding to the medium configuration information acquisition packet 501, to the low-speed communication controller 230 of the RW 200 by low-speed communication.

When medium configuration information is read out from the built-in memory, the low-speed communication chip 120 sends the medium configuration information acquisition response 502 including the medium configuration information via the encrypted communication path by low-speed communication.

That is, in regard to the medium configuration information read out from the built-in memory, the low-speed communication chip 120 performs encryption (encryption based on the encrypted communication path) using the encryption key obtained by mutual authentication between the non-contact communication medium 100 and the RW 200.

The low-speed communication chip 120 sends the medium configuration information acquisition response 502 including the encrypted data obtained by encryption by low-speed communication.

As performed above, by encrypting the encrypted data, the medium configuration information is sent securely from the non-contact communication medium 100 to the RW 200.

The medium configuration information acquisition response 502 sent by the low-speed communication chip 120 is received by the low-speed communication controller 230 (FIG. 6) of the RW 200.

When the medium configuration information acquisition response 502 from the low-speed communication chip 120 is received, the low-speed communication controller 230 (FIG. 6) of the RW 200 returns a medium configuration information acquisition response 503 with the same content as the medium configuration information acquisition response 502 to the RW controlling CPU 210 as a response to the medium configuration information acquisition request 500.

The RW controlling CPU 210 receives the medium configuration information acquisition response 503 from the low-speed communication controller 230 and checks whether or not an error has been generated in the medium configuration information acquisition response 503.

Here, in the case when an error has been generated in the medium configuration information acquisition response 503, the RW controlling CPU 210 does not perform the subsequent processing.

In the case when an error has not been generated in the medium configuration information acquisition response 503, the RW controlling CPU 210 supplies a data decryption request 510, which includes the encrypted data included in the medium configuration information acquisition response 503 and requests decryption of the encrypted data, to the security process controller 250.

The security process controller 250 receives the data decryption request 510 from the RW controlling CPU 210, and in regard to the encrypted data included in the data decryption request 510, performs decryption (decryption based on the encrypted communication path) using the encryption key obtained by mutual authentication between the non-contact communication medium 100 and the RW 200.

Then, the security process controller 250 returns a data decryption response 511, which includes the medium configuration information of the non-contact communication medium 100 brought close to the RW 200 which is obtained from the decryption result, to the RW controlling CPU 210.

The RW controlling CPU 210 receives the medium configuration information (medium configuration information of the non-contact communication medium 100) from the security process controller 250 and determines whether or not to perform high-speed communication with the non-contact communication medium 100 which has the medium configuration information.

In the determination of whether or not to perform high-speed communication, a configuration information validity determination (check), a high-speed communication determination and a wireless electrical power transmission determination are performed.

That is, the RW controlling CPU 210 firstly performs the configuration information validity determination.

In the configuration information validity determination, the RW controlling CPU 210 checks the medium revision, the configuration information revision, the configuration information parity, and the maximum electrical power consumption (FIG. 7) included in the medium configuration information of the non-contact communication medium 100.

Then, in a case when the revision number of at least one of the medium revision or the configuration information revision is not supported by the RW 200, the RW controlling CPU 210 determines that high-speed communication is not to be performed.

Additionally, also in a case when the result of the parity check of the configuration information parity is a parity error, the RW controlling CPU 210 determines that high-speed communication is not to be performed.

Furthermore, also in a case when the maximum electrical power consumption exceeds a maximum value that is able to be supplied by the RW 200 by wireless electrical power transmission, the RW controlling CPU 210 determines that high-speed communication is not to be performed.

In a case when both of the medium revision and the configuration information revision are revision numbers supported by the RW 200, a parity error is not generated, and the maximum electrical power consumption does not exceed the maximum value that is able to be supplied by the RW 200 by wireless electrical power transmission, the RW controlling CPU 210 performs the high-speed communication determination.

In the high-speed communication determination, the RW controlling CPU 210 checks the high-speed communication revision, the high-speed communication method, and the high-speed communication antenna information (FIG. 7) which are included in the medium configuration information of the non-contact communication medium 100 and are communication information relating to high-speed communication.

Then, in a case when any one of the high-speed communication revision, the high-speed communication method, and the high-speed communication antenna information which are included in the medium configuration information of the non-contact communication medium 100 is not supported by the RW 200, the RW controlling CPU 210 determines that high-speed communication is not to be performed since it is not possible to perform high-speed communication between the non-contact communication medium 100 and the RW 200.

Here, in the case when the high-speed communication antenna information included in the medium configuration information is not supported by the RW 200, from the arrangement state of the high-speed communication antenna 113 recognized from the high-speed communication antenna information, when the non-contact communication medium 100 is brought close to the RW 200, the deviation amount of the positional deviation of, for example, the high-speed communication antenna 113 (FIG. 2) of the non-contact communication medium 100 and the high-speed communication antenna 221 of the RW 200 is large and there are cases when it is not possible to perform receiving or sending of high-speed communication signals of a sufficient level between the non-contact communication medium 100 and the RW 200.

That is, on a surface (referred to below as proximity surface) of the RW 200 which has had the non-contact communication media 100 or 101 brought close, it is possible to provide a shallow indentation in the proximity surface in a shape slightly larger than the shape of the non-contact communication media 100 or 101 or the like so that it is easy to set the non-contact communication media 100 or 101 of a card shape or the like.

In this case, the non-contact communication media 100 or 101 is set to fit into the indentation provided in the proximity surface of the RW 200.

Then, in the case when, for example, the non-contact communication medium 100 is set to fit into the indentation provided in the proximity surface of the RW 200, the RW 200 recognizes that the RW 200 does not support the high-speed communication antenna information included in the medium configuration information when the deviation amount of the positional deviation of the high-speed communication antenna 113 (FIG. 2) of the non-contact communication medium 100 and the high-speed communication antenna 221 of the RW 200 is larger than a predetermined threshold value based on the arrangement state of the high-speed communication antenna 113 recognized from the high-speed communication antenna information included in the medium configuration information of the non-contact communication medium 100.

On the other hand, in the case when all of the high-speed communication revision, the high-speed communication method, and the high-speed communication antenna information included in the medium configuration information of the non-contact communication medium 100 are supported by the RW 200, the RW controlling CPU 210 performs the wireless electrical power transmission determination.

In the wireless electrical power transmission determination, the RW controlling CPU 210 checks the wireless electrical power transmission revision, the wireless electrical power transmission method, and the wireless electrical power transmission antenna information (FIG. 7) which is wireless electrical power transmission information relating to wireless electrical power transmission included in the medium configuration information of the non-contact communication medium 100.

Then, in a case when any one of the wireless electrical power transmission revision, the wireless electrical power transmission method, and the wireless electrical power transmission antenna information which are included in the medium configuration information of the non-contact communication medium 100 is not supported by the RW 200, the RW controlling CPU 210 determines that high-speed communication is not to be performed since it is not possible to supply the non-contact communication medium 100 with the necessary electrical power by wireless electrical power transmission revision.

On the other hand, in the case when all of the wireless electrical power transmission revision, the wireless electrical power transmission method, and the wireless electrical power transmission antenna information included in the medium configuration information of the non-contact communication medium 100 are supported by the RW 200, the RW controlling CPU 210 determines that high-speed communication is to be performed.

When it is determined that high-speed communication is to be performed, as described later, the RW controlling CPU 210 begins wireless electrical power transmission, and after that, begins high-speed communication.

Additionally, when it is determines that high-speed communication is not to be performed, the RW controlling CPU 210 does not perform the subsequent processing.

Accordingly, in the case when the RW 200 does not support any one of the high-speed communication revision, the high-speed communication method, the high-speed communication antenna information, the wireless electrical power transmission revision, the wireless electrical power transmission method, or the wireless electrical power transmission antenna information included in the medium configuration information, it is possible to suppress unnecessary consumption of electrical power since wireless electrical power transmission and high-speed communication are not performed.

That is, in the case when the RW 200 does not support any one of the high-speed communication revision, the high-speed communication method, the high-speed communication antenna information, the wireless electrical power transmission revision, the wireless electrical power transmission method, or the wireless electrical power transmission antenna information included in the medium configuration information, with regard to the non-contact communication medium 100, the supply of electrical power sufficient for high-speed communication is not possible by wireless electrical power transmission or the performing of high-speed communication between the non-contact communication medium 100 and the RW 200 is not possible, so that it is not ultimately possible to perform high-speed communication between the non-contact communication medium 100 and the RW 200.

Then, unnecessary electrical power is consumed by beginning wireless electrical power transmission in the RW 200 even though it is not possible to perform high-speed communication between the non-contact communication medium 100 and the RW 200.

Therefore, as described above, in the case when the RW 200 does not support any one of the high-speed communication revision, the high-speed communication method, the high-speed communication antenna information, the wireless electrical power transmission revision, the wireless electrical power transmission method, or the wireless electrical power transmission antenna information included in the medium configuration information, it is possible to suppress unnecessary consumption of electrical power in the RW 200 by not performing wireless electrical power transmission (and thus high-speed communication).

Wireless Electrical Power Transmission

Figure 9:
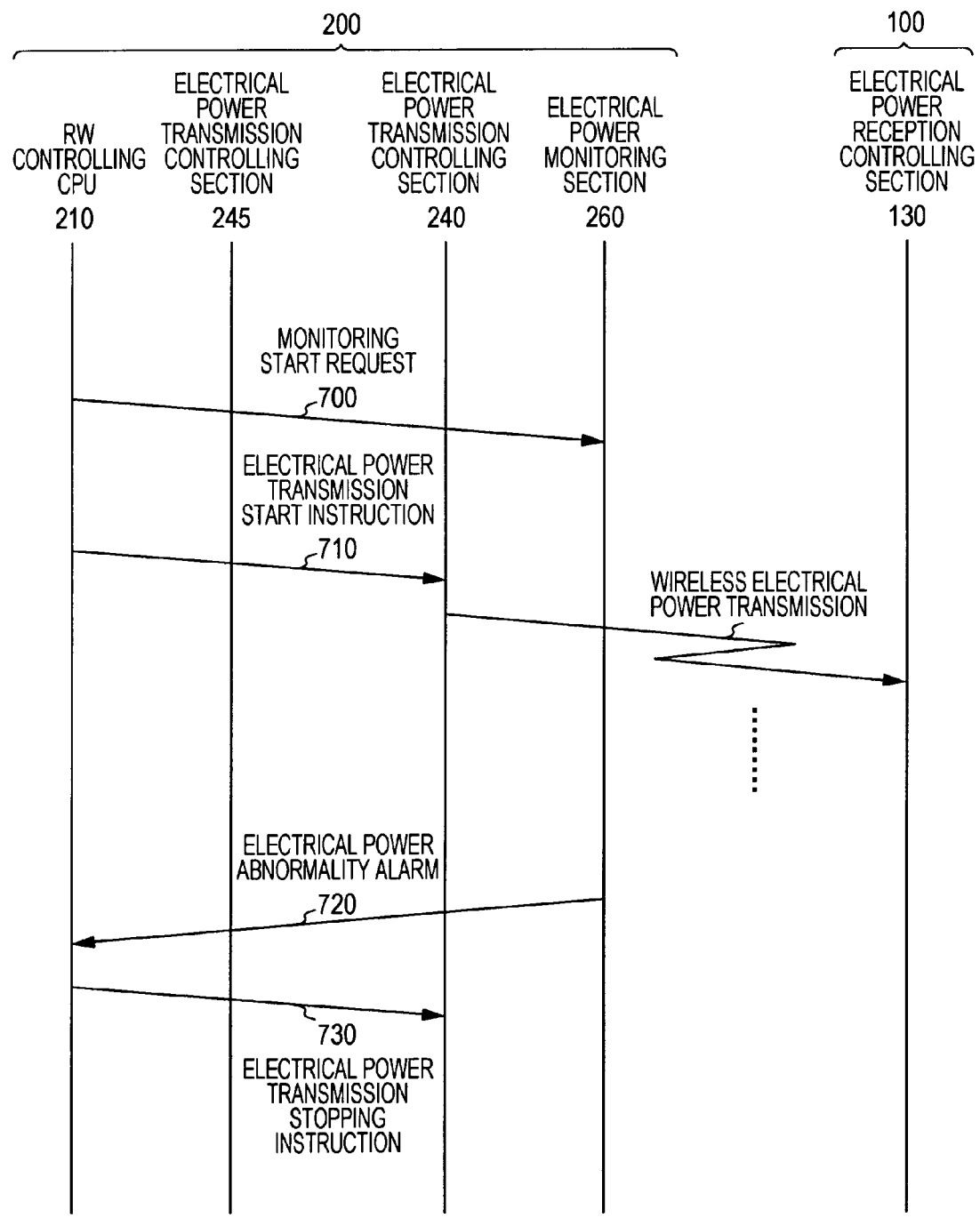
FIG. 9 is a diagram describing processing of wireless electrical power transmission performed by the RW.

FIG. 9 is a diagram describing processing of wireless electrical power transmission performed by the RW 200.

The RW 200 begins wireless electrical power transmission when it is determined that high-speed communication is to be performed, as described in FIG. 8.

That is, the RW controlling CPU 210 (FIG. 6) of the RW 200 sends a monitoring start request 700, which requests monitoring of the electrical power supplied to the non-contact communication medium 100 brought close to the RW 200 by wireless electrical power transmission, to the electrical power monitoring section 260.

Here, the RW controlling CPU 210 sets a threshold value of the electrical power (referred to below as electrical power threshold value) supplied to the non-contact communication medium 100 from the maximum electrical power consumption included in the medium configuration information of the non-contact communication medium 100 brought close to the RW 200.

For example, the actual maximum electrical power consumption included in the medium configuration information, a reduced value where a predetermined margin has been deducted from the maximum electrical power consumption, or the like is set as the electrical power threshold value.

Then, the RW controlling CPU 210 sends the electrical power threshold value included in the monitoring start request 700 to the electrical power monitoring section 260.

The electrical power monitoring section 260 receives the monitoring start request 700 from the RW controlling CPU 210, and according to the monitoring start request 700, begins monitoring of the electrical power supplied to the non-contact communication medium 100 brought close to the RW 200 by wireless electrical power transmission performed by the electrical power transmission controlling sections 240 or 245.

Here, the electrical power monitored by the electrical power monitoring section 260 may be the electrical power supplied by the electrical power transmission controlling sections 240 or 245 by wireless electrical power transmission, but in the present embodiment, out of the electrical power supplied by the electrical power transmission controlling sections 240 or 245 by wireless electrical power transmission, it is set as the electrical power supplied to the non-contact communication medium 100 brought close to the RW 200, that is, the electrical power of which a supply is (actually) received by the non-contact communication medium 100.

The electrical power monitoring section 260 estimates transmission efficiency of the electrical power using wireless electrical power transmission from the arrangement state of the electrical power transmission antennas 241 or 246 (FIG. 6) of the RW 200 which output wireless electrical power transmission RF signals, the arrangement state of the electrical power reception antenna 131 (FIG. 2) of the non-contact communication medium 100 brought close to the RW 200 which receives wireless electrical power transmission RF signals, or the like. From the transmission efficiency and the electrical power supplied by the electrical power transmission controlling sections 240 or 245 by wireless electrical power transmission, the electrical power monitoring section 260 calculates the electrical power (referred to below as received electrical power) of which a supply is received by non-contact communication medium 100 brought close to the RW 200.

After that, the RW controlling CPU 210 selects the one out of the electrical power transmission controlling sections 240 and 245 appropriate for wireless electrical power transmission to the non-contact communication medium 100 brought close to the RW 200 based on the wireless electrical power transmission revision, the wireless electrical power transmission method, and the wireless electrical power transmission antenna information included in the medium configuration information of the non-contact communication medium 100 brought close to the RW 200.

Here, in the present embodiment, the non-contact communication medium 100 is the new model as described above. Furthermore, in the RW 200, the electrical power transmission controlling section 240 supports the new model and the electrical power transmission controlling section 245 supports the old model.

As a result, in the RW controlling CPU 210, out of the electrical power transmission controlling sections 240 and 245, the electrical power transmission controlling section 240 which supports the new model is selected as the one appropriate for wireless electrical power transmission to the non-contact communication medium 100 brought close to the RW 200 based on the wireless electrical power transmission revision, the wireless electrical power transmission method, and the wireless electrical power transmission antenna information included in the medium configuration information of the non-contact communication medium 100 brought close to the RW 200.

In addition, for example, in the RW 200, the electrical power transmission controlling section 240 which supports the new model and a plurality of similar electrical power transmission controlling sections are provided, and the wireless electrical power transmission antenna information is referenced such as when, in a case when an antenna (electrical power transmission antenna) for wireless electrical power transmission is connected to each of the plurality of electrical power transmission controlling sections, the electrical power transmission controlling section, which is connected to the antenna with the highest transmission efficiency of electrical power supplied to the non-contact communication medium 100, is selected as the one appropriate for wireless electrical power transmission to the non-contact communication medium 100, or when, in a case when a plurality of antennas for wireless electrical power transmission is connected to the electrical power transmission controlling section 240 which supports the new model, the antenna with the highest transmission efficiency of electrical power supplied to the non-contact communication medium 100 is selected as the one appropriate for wireless electrical power transmission to the non-contact communication medium 100.

When the electrical power transmission controlling section 240 is selected as the one appropriate for wireless electrical power transmission to the non-contact communication medium 100 brought close to the RW 200, the RW controlling CPU 210 sends an electrical power transmission start instruction 710 which instructs the start of wireless electrical power transmission to the electrical power transmission controlling section 240.

The electrical power transmission controlling section 240 which supports the new model receives the electrical power transmission start instruction 710 from the RW controlling CPU 210, and according to the electrical power transmission start instruction 710, output of RF signals for wireless electrical power transmission via the electrical power transmission antenna 241 begins. According to this, wireless electrical power transmission to the non-contact communication medium 100 which is the new model brought close to the RW 200 begins.

As per above, after the start of the low-speed communication, the electrical power reception controlling section 130 of the non-contact communication medium 100 (FIG. 2) receives the electrical power sent by wireless electrical power transmission, which was begun by the electrical power transmission controlling section 240 of the RW 200, via the electrical power reception antenna 131.

Then, the electrical power reception controlling section 130 begins the supply of electrical power by wireless electrical power transmission to the medium controlling CPU 110, the non-volatile memory 111, and the high-speed communication slave controller 112.

The medium controlling CPU 110, the non-volatile memory 111, and the high-speed communication slave controller 112 begin to operate with the electrical power from the electrical power reception controlling section 130 as a power source.

In addition, in a case when it is not the non-contact communication medium 100 (FIG. 2) which is the new model but the non-contact communication medium 101 (FIG. 4) which is the old model which is brought close to the RW 200, in the RW controlling CPU 210 of the RW 200, out of the electrical power transmission controlling sections 240 and 245, the electrical power transmission controlling section 245 which supports the old model is selected as the one appropriate for wireless electrical power transmission to the non-contact communication medium 101 brought close to the RW 200 based on the wireless electrical power transmission revision, the wireless electrical power transmission method, and the wireless electrical power transmission antenna information included in the medium configuration information of the non-contact communication medium 101 brought close to the RW 200.

Then, the RW controlling CPU 210 sends the electrical power transmission start instruction 710 which instructs the start of wireless electrical power transmission to the electrical power transmission controlling section 245 selected as the one appropriate for wireless electrical power transmission to the non-contact communication medium 101 brought close to the RW 200.

According to this, the electrical power transmission controlling section 245 which supports the old model begins output of RF signals for wireless electrical power transmission via the electrical power transmission antenna 246, and according to this, wireless electrical power transmission to the non-contact communication medium 101 which is the old model brought close to the RW 200 begins.

As described above, the electrical power monitoring section 260 monitors the electrical power of which a supply is received by the non-contact communication medium 100 brought close to the RW 200, that is, in this case, the received electrical power of which a supply is received by the non-contact communication medium 100 brought close to the RW 200 by wireless electrical power transmission by the electrical power transmission controlling section 240 which supports the new model.

Then, in a case when the received electrical power exceeds the electrical power threshold value which is set from the maximum electrical power consumption by the RW controlling CPU 210, the electrical power monitoring section 260 notifies the RW controlling CPU 210 of an electrical power abnormality alarm 720 which expresses the exceeding of the threshold.

In a case when the electrical power abnormality alarm 720 is received from the electrical power monitoring section 260, the RW controlling CPU 210 supplies an electrical power transmission stopping instruction 730, which instructs a stopping of the wireless electrical power transmission, to the electrical power transmission controlling section 240 performing wireless electrical power transmission.

When the electrical power transmission stopping instruction 730 is received from the RW controlling CPU 210, the electrical power transmission controlling section 240 performing wireless electrical power transmission stops the wireless electrical power transmission.

As per above, in the RW 200, in the case when the received electrical power of which a supply is received by the non-contact communication medium 100 brought close to the RW 200 exceeds the electrical power threshold value which is set from the maximum electrical power consumption (for example, the actual maximum electrical power consumption), the wireless electrical power transmission is stopped, and thus, it is possible to suppress unnecessary consumption of electrical power.

That is, in the case when the non-contact communication medium 100 and the RW 200 are brought close, for example, if a conductor such as a metallic clip or the like is interposed between the non-contact communication medium 100 and the RW 200, in the RW 200, unnecessary electrical power such as electrical power which is more than the electrical power necessary for the high-speed communication of the non-contact communication medium 100 may be supplied to the non-contact communication medium 100 by wireless electrical power transmission.

In a case when the received electrical power exceeds the electrical power threshold value, in the RW 200, since wireless electrical power transmission is stopped, it is possible to prevent unnecessary electrical power which exceeds the electrical power threshold value being supplied to the non-contact communication medium 100 brought close to the RW 200 and to suppress unnecessary consumption of electrical power such as this.

Here, as described in FIG. 8, in the RW 200 (FIG. 6), the low-speed communication controller 230 outputs the low-speed communication RF signals for performing polling which detects whether the non-contact communication media 100 or 101 have been brought close to the RW 200.

As a result, in the RW 200, when the electrical power transmission controlling section 240 (or 245) begins wireless electrical power transmission, there may be interference generated between the low-speed communication RF signals output by the low-speed communication controller 230 and the wireless electrical power transmission RF signals output by the electrical power transmission controlling section 240 for wireless electrical power transmission.

That is, as the frequency of the wireless electrical power transmission RF signals, for example, from a few hundred KHz to a few MHz is adopted due to the following reasons; that it is not easy to manufacture a circuit with a GHz band, that it is easy to manufacture a circuit with a frequency from a few hundred KHz to a few MHz, and that parts such as a condenser for configuring the circuit with a frequency from a few hundred KHz to a few MHz have low cost and it is possible to suppress the costs of the circuit.

In the electrical power transmission controlling section 240 (or 245) of the RW 200 (FIG. 3), in a case when wireless electrical power transmission is performed at such a frequency, as the communication method of the low-speed communication, for example, when FeliCa (registered trademark) is adopted as described above, the FeliCa (registered trademark) carrier frequency is 13.56 MHz, and since it is close to the frequency of the wireless electrical power transmission RF signals, there may be interference generated between the FeliCa (registered trademark) carrier, that is the low-speed communication RF signals, and the wireless electrical power transmission RF signals.

As per above, in the case when interference occurs between the low-speed communication RF signals and the wireless electrical power transmission RF signals, in order to prevent the interference, in the low-speed communication controller 230 of the RW 200, it is possible to stop the output of the low-speed communication RF signals after the acquisition of the medium configuration information (after the reception of the medium configuration information acquisition response 502 (FIG. 8)) and before the wireless electrical power transmission.

In addition, as each of the low-speed communication RF signals and the wireless electrical power transmission RF signals, in the case when the frequencies of the RF signals which do not generate interference with each other are adopted, it is not necessary to stop the output of the low-speed communication RF signals.

High-Speed Communication

Figure 10:
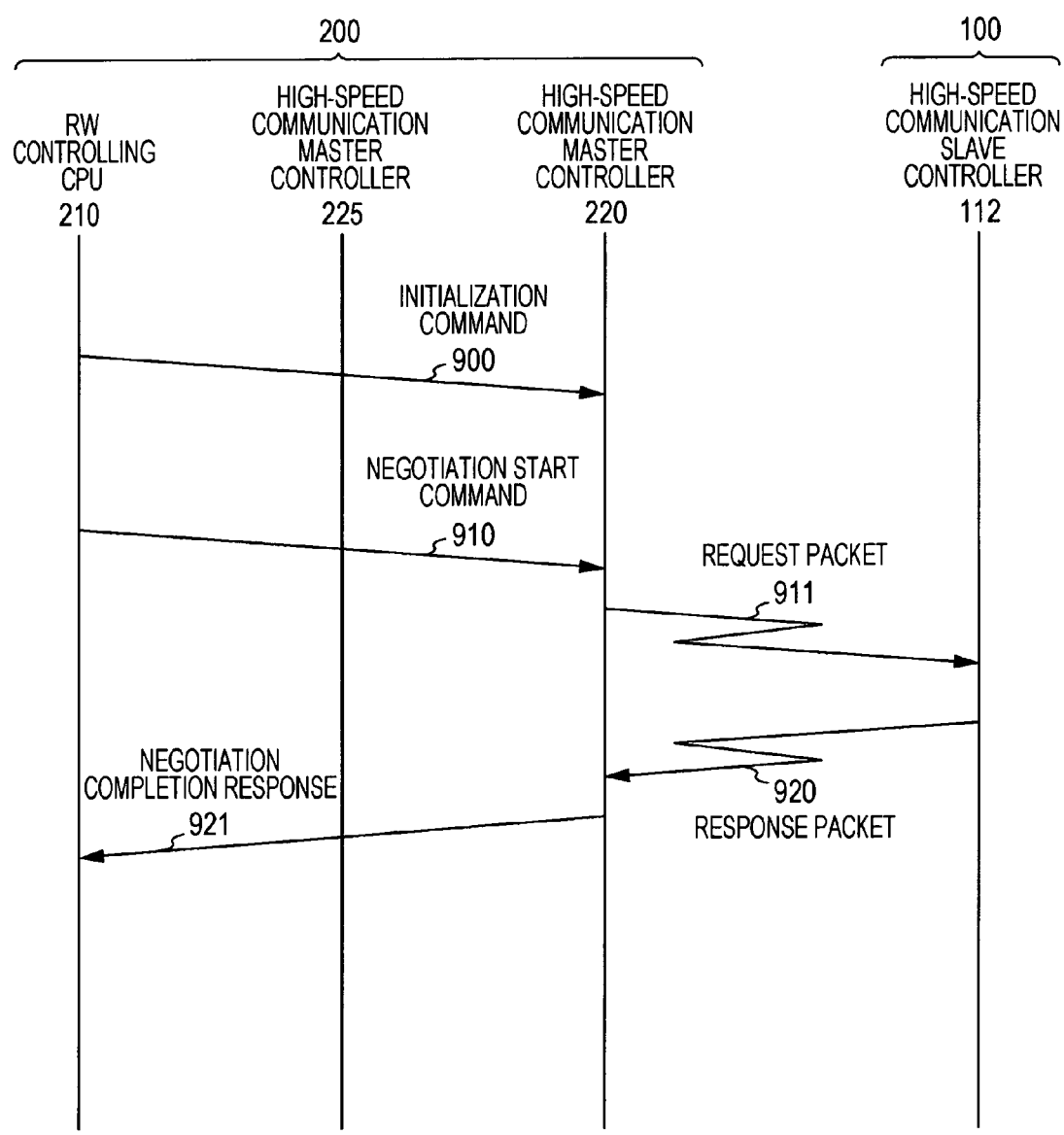
FIG. 10 is a diagram describing processing of high-speed communication performed by the RW.

FIG. 10 is a diagram describing the processing of high-speed communication performed by the RW 200.

As described in FIG. 9, in the RW 200, when wireless electrical power transmission to the non-contact communication medium 100 brought close to the RW 200 begins, in the non-contact communication medium 100 (FIG. 2), the electrical power reception controlling section 130 supplies electrical power by wireless electrical power transmission to the medium controlling CPU 110, the non-volatile memory 111, and the high-speed communication slave controller 112.

According to this, in the non-contact communication medium 100 brought close to the RW 200, the medium controlling CPU 110, the non-volatile memory 111, and the high-speed communication slave controller 112 begin to operate with the electrical power from the electrical power reception controlling section 130 as a power source, and are in a state of being able to perform high-speed communication.

On the other hand, in the RW 200, after the wireless electrical power transmission has began, the RW controlling CPU 210 selects the one out of the high-speed communication master controllers 220 or 225 appropriate for high-speed communication with the non-contact communication medium 100 brought close to the RW 200 based on the high-speed communication revision, the high-speed communication method, and the high-speed communication antenna information included in the medium configuration information of the non-contact communication medium 100 brought close to the RW 200.

Here, in the present embodiment, the non-contact communication medium 100 is the new model as described above. Furthermore, in the RW 200, the high-speed communication master controller 220 supports the new model and the high-speed communication master controller 225 supports the old model.

As a result, in the RW controlling CPU 210, out of the high-speed communication master controllers 220 or 225, the high-speed communication master controller 220 which supports the new model is selected as the one appropriate for high-speed communication with the non-contact communication medium 100 brought close to the RW 200 based on the high-speed communication revision, the high-speed communication method, and the high-speed communication antenna information included in the medium configuration information of the non-contact communication medium 100 brought close to the RW 200.

In addition, for example, in the RW 200, the high-speed communication master controller 220 which supports the new model and a plurality of similar high-speed communication master controllers are provided, and the high-speed communication antenna information is referenced such as when, in a case when an antenna (high-speed communication antenna) for high-speed communication is connected to each of the plurality of high-speed communication master controllers, the high-speed communication master controller, which is connected to the antenna with the highest high-speed communication RF signal level received by the non-contact communication medium 100, is selected as the one appropriate for high-speed communication with the non-contact communication medium 100, or when, in a case when a plurality of antennas for high-speed communication is connected to the high-speed communication master controller 220 which supports the new model, the antenna with the highest high-speed communication RF signal level received by the non-contact communication medium 100 is selected as the one appropriate for high-speed communication with the non-contact communication medium 100.

When the high-speed communication master controller 220 is selected as the one appropriate for high-speed communication with the non-contact communication medium 100 brought close to the RW 200, the RW controlling CPU 210 sends an initialization command 900 which requests initialization for high-speed communication to the high-speed communication master controller 220.

The high-speed communication master controller 220 receives the initialization command 900 from the RW controlling CPU 210 and performs the necessary initialization according to the initialization command 900.

Furthermore, after that, the RW controlling CPU 210 sends a negotiation start command 910, which requests negotiation of exchanging information necessary for performing high-speed communication, to the high-speed communication master controller 220.

The high-speed communication master controller 220 receives the negotiation start command 910 from the RW controlling CPU 210, and according to the negotiation start command 910, begins output of the high-speed communication RF signals via the high-speed communication antenna 221 and sends a request packet 911 including information necessary for high-speed communication for requesting information and the like necessary for performing high-speed communication.

On the other hand, in the non-contact communication medium 100 (FIG. 2), the medium controlling CPU 110, the non-volatile memory 111, and the high-speed communication slave controller 112 begin to operate with the electrical power from the electrical power reception controlling section 130 as a power source and perform the necessary initializations. When in a state of being able to receive the request packet 911 from the RW 200, the high-speed communication slave controller 112 receives the request packet 911 sent from the high-speed communication master controller 220 of the RW 200 (FIG. 6) and returns a response packet 920 including the necessary information as the response to the request packet 911.

The high-speed communication master controller 220 of the RW 200 (FIG. 3) receives the response packet 920 from the high-speed communication slave controller 112 of the non-contact communication medium 100, and according to this, high-speed communication is possible between the high-speed communication slave controller 112 of the non-contact communication medium 100 and the high-speed communication master controller 220 of the RW 200.

When the response packet 920 from the high-speed communication slave controller 112 of the non-contact communication medium 100 is received, the high-speed communication master controller 220 of the RW 200 returns a negotiation completion response 921, which indicates that the high-speed communication negotiation is completed, to the RW controlling CPU 210.

Due to the above, in the high-speed communication slave controller 112 of the non-contact communication medium 100 (FIG. 2) and the high-speed communication master controller 220 of the RW 200 (FIG. 3), the initialization for high-speed communication is completed and the connection (communication link) is confirmed, and thus there is a state where data transmission (exchange) by high-speed communication is possible.

That is, the RW controlling CPU 210 of the RW 200 accesses the high-speed communication master controller 220 of the RW 200, the high-speed communication slave controller 112 of the non-contact communication medium 100 (FIG. 2), and via the medium controlling CPU 110, the non-volatile memory 111 by high-speed communication, and it is possible to write data and to read out data.

In addition, in the case when it is not the non-contact communication medium 100 (FIG. 2) which is the new model but the non-contact communication medium 101 (FIG. 4) which is the old model that is brought close to the RW 200, in the RW controlling CPU 210 of the RW 200, out of the high-speed communication master controllers 220 and 225, the high-speed communication master controller 225 which supports the old model is selected as the one appropriate for high-speed communication with the non-contact communication medium 101 brought close to the RW 200 based on the high-speed communication revision, the high-speed communication method, and the high-speed communication antenna information included in the medium configuration information of the non-contact communication medium 101 brought close to the RW 200.

Then, in the RW 200, high-speed communication with the non-contact communication medium 101 which is the old model is performed using the high-speed communication master controller 225 which supports the old model.

Processing by RW 200

Figure 11:
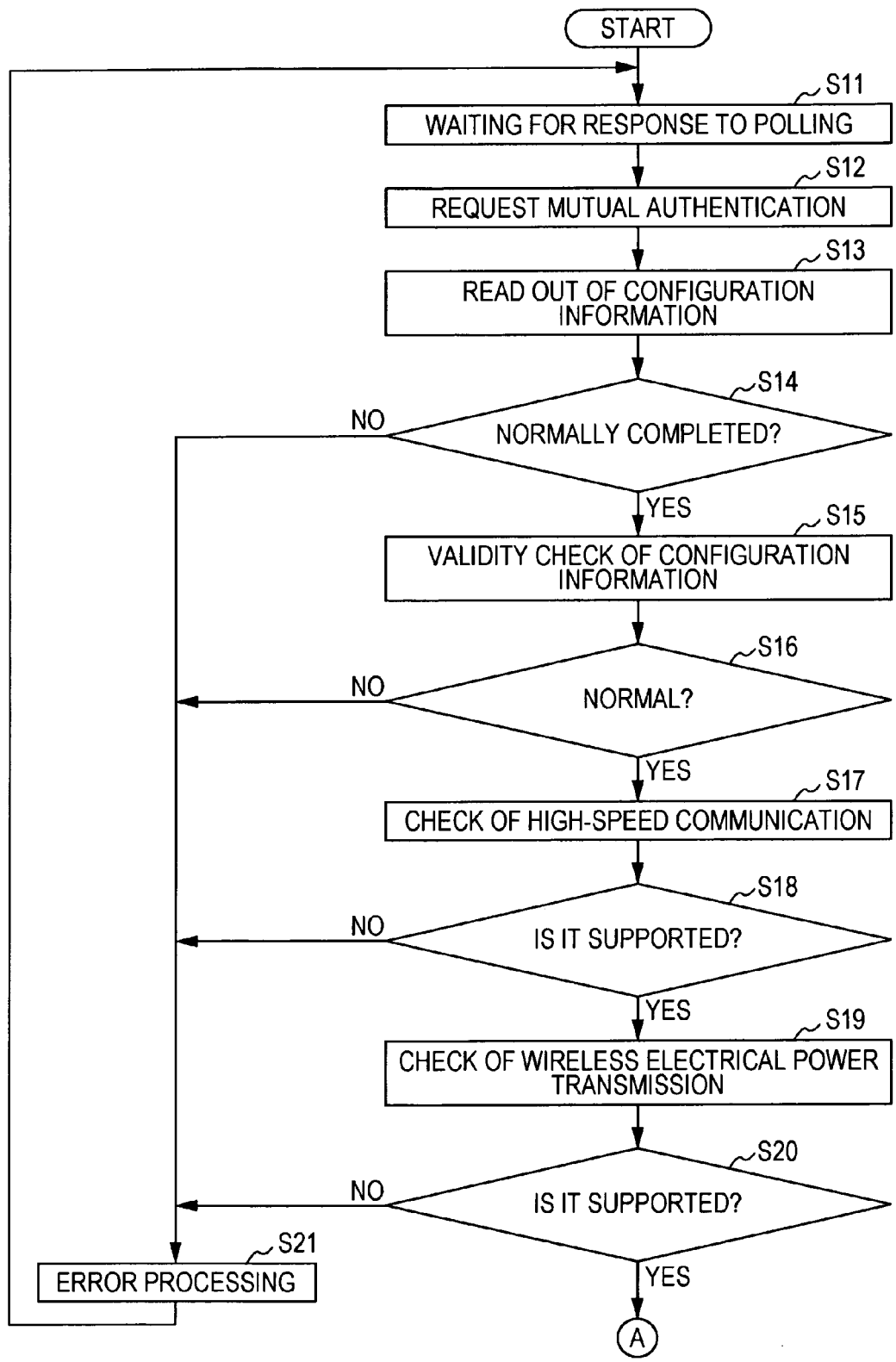
FIG. 11 is a flow chart describing processing by the RW.
Figure 12:
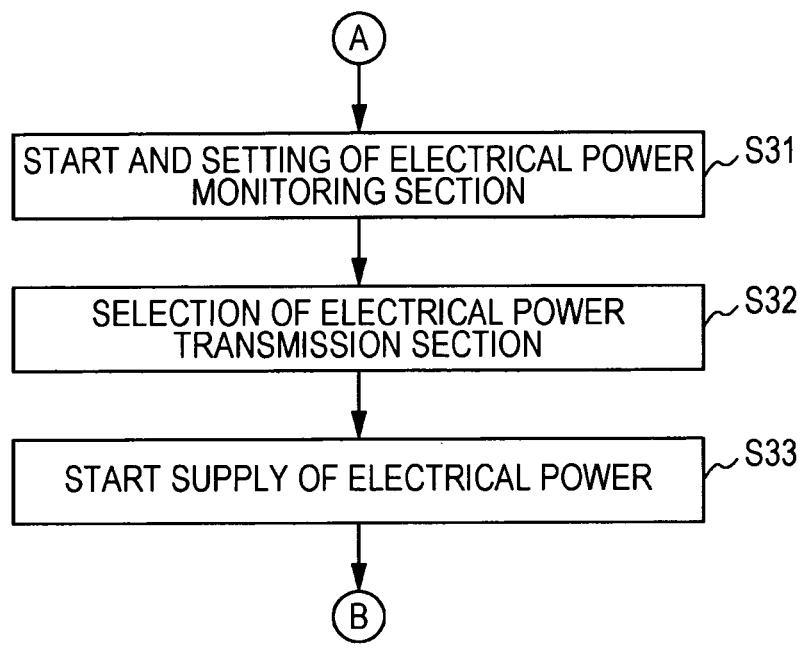
FIG. 12 is a flow chart describing processing by the RW.
Figure 13:
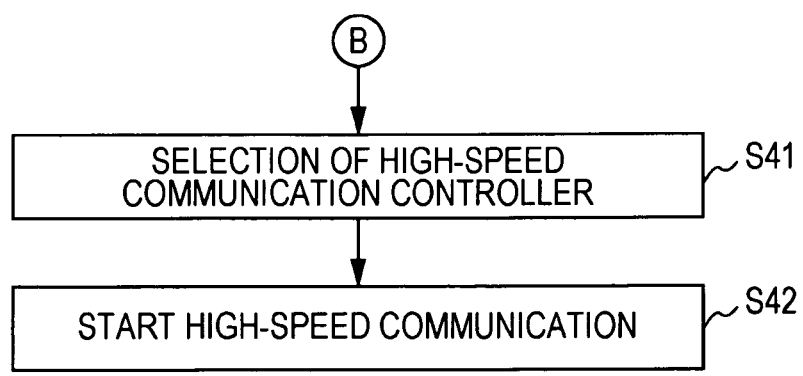
FIG. 13 is a flow chart describing processing by the RW.

FIGS. 11 to 13 are flow charts describing the processing by the RW 200 of FIG. 6.

In addition, the flow chart of FIG. 11 corresponds to the processing by the RW 200 described in FIG. 8, the flow chart of FIG. 12 corresponds to the processing by the RW 200 described in FIG. 9, and the flow chart of FIG. 13 corresponds to the processing by the RW 200 described in FIG. 10, respectively.

In the RW 200, the low-speed communication controller 230 (FIG. 6) begins low-speed communication polling, and in step S11, there is a state of waiting for a response to the polling.

Then, for example, when the non-contact communication medium 100 is brought close to the RW 200 and the low-speed communication chip 120 (FIG. 2) of the non-contact communication medium 100 returns a response to the low-speed communication polling from the RW 200 to the RW 200, the processing proceeds to step S12 from step S11, and the RW controlling CPU 210 (FIG. 6) of the RW 200 requests mutual authentication by low-speed communication to the security process controller 250.

Responding to the request for mutual authentication from the RW controlling CPU 210, the security process controller 250 performs mutual authentication with the low-speed communication chip 120 of the non-contact communication medium 100.

In a case when mutual authentication fails, the RW 200 begins low-speed communication polling without performing the subsequent processing, and in step S11, there is a state of waiting for a response to the polling.

On the other hand, in a case when mutual authentication is successful, the processing proceeds to step S13 from step S12, the RW controlling CPU 210 reads out the medium configuration information of the non-contact communication medium 100 brought close to the RW 200 from the non-contact communication medium 100 by low-speed communication via the low-speed communication controller 230, and the processing proceeds to step S14.

In step S14, the RW controlling CPU 210 determines whether or not it is possible to normally read out the medium configuration information from the non-contact communication medium 100, and in a case when it is determined that a normal read out is not possible (in a case when an error is generated), the processing proceeds to step S21.

Additionally, in step S14, in a case when it is determined that it is possible to normally read out the medium configuration information from the non-contact communication medium 100, the processing proceeds to step S15. The RW controlling CPU 210 of the RW 200 performs the configuration information validity determination of checking the medium revision, the configuration information revision, the configuration information parity, and the maximum electrical power consumption included in the medium configuration information, and the processing proceeds to step S16.

In step S16, the RW controlling CPU 210 determines whether or not the result of the configuration information validity determination is normal.

In step S16, in a case when it is determined that the result of the configuration information validity determination is not normal, that is, in the case when at least any one of the medium revision and the configuration information revision are revision numbers which are not supported by the RW 200, in the case when the result of the parity check of the configuration information parity is a parity error, or in the case when the maximum electrical power consumption exceeds the maximum value that is able to be supplied by the RW 200 by wireless electrical power transmission, the processing proceeds to step S21.

Additionally, in step S16, in a case when it is determined that the result of the configuration information validity determination is normal, that is, in the case when both of the medium revision and the configuration information revision are revision numbers supported by the RW 200, a parity error is not generated and the maximum electrical power consumption does not exceed the maximum value that is able to be supplied by the RW 200 by wireless electrical power transmission, the processing proceeds to step S17. The RW controlling CPU 210 performs the high-speed communication determination of checking the high-speed communication revision, the high-speed communication method and high-speed communication antenna information which are included in the medium configuration information, and the processing proceeds to step S18.

In step S18, the RW controlling CPU 210 determines whether or not the RW 200 supports the non-contact communication medium 100 brought close to the RW 200 based on the result of the high-speed communication determination.

In step 18, in a case when it is determined that the RW 200 does not support the non-contact communication medium 100 brought close to the RW 200, that is, when any one of the high-speed communication revision, the high-speed communication method, and the high-speed communication antenna information are not supported by the RW 200, the processing proceeds to step S21.

Additionally, in step S18, in a case when it is determined that the RW 200 supports the non-contact communication medium 100 brought close to the RW 200, that is, in the case when all of the high-speed communication revision, the high-speed communication method, and the high-speed communication antenna information are supported by the RW 200, the processing proceeds to step S19. The RW controlling CPU 210 performs the wireless electrical power transmission determination of checking the wireless electrical power transmission revision, the wireless electrical power transmission method, and the wireless electrical power transmission antenna information which are included in the medium configuration information, and the processing proceeds to step S20.

In step S20, the RW controlling CPU 210 determines whether or not the RW 200 supports the non-contact communication medium 100 brought close to the RW 200 based on the result of the wireless electrical power transmission determination.

In step S20, in a case when it is determined that the RW 200 does not support the non-contact communication medium 100 brought close to the RW 200, that is, in the case when any one of the wireless electrical power transmission revision, the wireless electrical power transmission method, and the wireless electrical power transmission antenna information are not supported by the RW 200, the processing proceeds to step S21.

In step S21, the RW controlling CPU 210 performs predetermined error processing, and after that, begins low-speed communication polling, and returns to step S11 and there is a state of waiting for a response to the polling.

Additionally, in step S20, in a case when it is determined that the RW 200 supports the non-contact communication medium 100 brought close to the RW 200, that is, in the case when all of the wireless electrical power transmission revision, the wireless electrical power transmission method, and the wireless electrical power transmission antenna information are supported by the RW 200, the processing proceeds to step S31 of FIG. 12, and below, the RW 200 performs wireless electrical power transmission.

That is, in step S31 of FIG. 12, the RW controlling CPU 210 (FIG. 6) of the RW 200 sets the electrical power threshold value, which is a threshold for the received electrical power of which a supply is received by the non-contact communication medium 100, from the maximum electrical power consumption included in the medium configuration information of the non-contact communication medium 100 brought close to the RW 200. The monitoring of the received electrical power, of which a supply is received by the non-contact communication medium 100 brought close to the RW 200 by wireless electrical power transmission, is begun by supplying the electrical power threshold value to the electrical power monitoring section 260.

After that, the processing proceeds to step S32 from step S31, and out of the electrical power transmission controlling sections 240 and 245, the RW controlling CPU 210 selects the electrical power transmission controlling section 240 which supports the new model as the one appropriate for wireless electrical power transmission to the non-contact communication medium 100 which is the new model brought close to the RW 200 based on the wireless electrical power transmission revision, the wireless electrical power transmission method, and the wireless electrical power transmission antenna information included in the medium configuration information of the non-contact communication medium 100 brought close to the RW 200. The processing proceeds to step S33.

In step S33, the RW controlling CPU 210 makes the electrical power transmission controlling section 240 selected in step S32 begin wireless electrical power transmission, and the processing proceeds to step S41 of FIG. 13.

In addition, the electrical power monitoring section 260 monitors the received electrical power of which a supply is received by the non-contact communication medium 100 brought close to the RW 200 by wireless electrical power transmission begun by the electrical power transmission controlling section 240. Then, in a case when the received electrical power exceeds the electrical power threshold value, wireless electrical power transmission by the electrical power transmission controlling section 240 is stopped.

In the step S41 of FIG. 13, out of the high-speed communication master controllers 220 and 225, the RW controlling CPU 210 selects the high-speed communication master controller 220 which supports the new model as the one appropriate for high-speed communication with the non-contact communication medium 100 which is the new model brought close to the RW 200 based on the high-speed communication revision, the high-speed communication method, and the high-speed communication antenna information included in the medium configuration information of the non-contact communication medium 100 brought close to the RW 200, and the processing proceeds to step S42.

In the step S42, the RW controlling CPU 210 makes the high-speed communication master controller 220 selected in step S41 begin high-speed communication.

Then, the RW 200 stops wireless electrical power transmission in a case when the necessary data writing from the RW 200 to the non-volatile memory 111 of the non-contact communication medium 100 by high-speed communication is completed or when the necessary electrical power for high-speed communication is not supplied to the non-contact communication medium 100 and a response from the non-contact communication medium 100 to the RW 200 is not returned due to the non-contact communication medium 100 being moved away from the RW 200.

Furthermore, the RW 200 begins low-speed communication polling, the processing returns to step S11 of FIG. 11 and there is a state of waiting for a response to the polling.

As per above, in the non-contact communication medium 100 (FIG. 2) (and the same for the non-contact communication medium 101 (FIG. 4)), the low-speed communication chip 120 sends the configuration information, which includes the maximum electrical power consumption consumed by high-speed communication such as TransferJet (registered trademark), by low-speed communication such as FeliCa (registered trademark) to the RW 200, the electrical power reception controlling section 130 receives the electrical power which has begun to be sent from the RW 200 after the low-speed communication with the RW 200 has begun, and the high-speed communication slave controller 112 begins operating due to the electrical power received by the electrical power reception controlling section 130 and begins high-speed communication with the RW 200.

On the other hand, in the RW 200 (FIG. 6), the low-speed communication controller 230 receives the configuration information, which includes the maximum electrical power consumption consumed by the non-contact communication medium 100 in high-speed communication, from the non-contact communication medium 100 by low-speed communication, the electrical power transmission controlling section 240 begins wireless electrical power transmission after low-speed communication is begun with the non-contact communication medium 100, and the high-speed communication master controller 220 begins high-speed communication with the non-contact communication medium 100 after the wireless electrical power transmission has begun.

Furthermore, in the RW 200, the electrical power monitoring section 260 monitors the received electrical power of which a supply is received by the non-contact communication medium 100 by wireless electrical power transmission, and in the case when the received electrical power exceeds the electrical power threshold value set from the maximum electrical power consumption, the electrical power transmission controlling section 240 stops wireless electrical power transmission.

Accordingly, in the RW 200, for example, by performing wireless electrical power transmission so that large electrical power exceeding the maximum electrical power consumption of the non-contact communication medium 100 is supplied, the RW 200 is able to suppress unnecessary consumption of electrical power.

Furthermore, for example, supposing that in a case when only the low-speed communication chip 120 is taken out from the non-contact communication medium 100 (or that only the low-speed communication chip 1120 is taken out from the non-contact communication medium 101) and a counterfeit non-contact communication medium is manufactured with the low-speed communication chip 120 mounted therein, even in regard to the counterfeit non-contact communication medium, the RW 200 is able to suppress unnecessary consumption of electrical power in wireless electrical power transmission.

Additionally, in the medium configuration information, the high-speed communication method and the high-speed communication antenna information are included as communication information relating to high-speed communication performed by the non-contact communication medium 100, and the wireless electrical power transmission method and the wireless electrical power transmission antenna information are included as wireless electrical power transmission information relating to the wireless electrical power transmission of which a supply of electrical power is received by the non-contact communication medium 100 by wireless electrical power transmission. Thus, in the RW 200, based on the medium configuration information, it is possible to perform wireless electrical power transmission and high-speed communication which are appropriate to the non-contact communication medium 100, and as a result, in a case when a new non-contact communication medium which is not compatible with existing media is realized due to future technological innovations, it is possible to maintain backward compatibility.

That is, after the non-contact communication medium 101 which is the old model and an old model RW which supports only the non-contact communication medium 101 which is the old model are sold, even if there is developed the non-contact communication medium 100 which is the new model where performance (functionality) has been improved, that is, the non-contact communication medium 100 where wireless electrical power transmission method has been modified, the shape of the antenna for wireless electrical power transmission has been modified, the high-speed communication method has been modified, the shape of the antenna for high-speed communication has been modified, the communication protocol of high-speed communication has been modified due to improvements, and the like, and a new model RW which supports only the non-contact communication medium 100 which is the new model, in a case when the non-contact communication medium 100 and the RW which are the new models do not have compatibility with the non-contact communication medium 101 and the RW which are the old models, it is difficult for the non-contact communication medium 100 and the RW which are the new models to be launched onto the market.

This is because it is only possible to use the non-contact communication medium 101 which is the old model with the old model RW and it is only possible to use the non-contact communication medium 100 which is the new model with the new model RW.

Therefore, it is possible to perform wireless electrical power transmission and high-speed communication appropriate to the non-contact communication medium based on the medium configuration information by, in regard to low-speed communication, developing an RW which supports both the old model and the new model on the premise of maintaining backward compatibility, storing medium configuration information in the non-contact communication media irrespective of whether the medium is the old model or the new model, and having the RW read out the medium configuration information from the non-contact communication medium by low-speed communication.

In addition, the RW 200 checks whether or not the wireless electrical power transmission method of the non-contact communication media 100 or 101 brought close to the RW 200 is supported based on the medium configuration information of the non-contact communication media 100 or 101 brought close to the RW 200 which is obtained by low-speed communication. In the case when it is supported, the RW 200 performs wireless electrical power transmission, and in the case when it is not supported, the RW 200 does not perform wireless electrical power transmission (or high-speed communication).

Additionally, the RW 200 checks whether or not the high-speed communication method of the non-contact communication media 100 or 101 brought close to the RW 200 is supported based on the medium configuration information of the non-contact communication media 100 or 101 brought close to the RW 200 which is obtained by low-speed communication. In the case when it is supported, the RW 200 performs high-speed communication, and in the case when it is not supported, the RW 200 does not perform high-speed communication.

Accordingly, in the case when the non-contact communication media 100 or 101 and the RW 200 are brought close, the medium configuration information is sent from the non-contact communication media 100 or 101, and it is possible for the low-speed communication received by the RW 200 to function as a so-called intelligence switch of whether or not to perform wireless electrical power transmission or high-speed communication.

Here, the medium controlling CPU 110 of the non-contact communication medium 100 (FIG. 2), the medium controlling CPU 1110 of the non-contact communication medium 101 (FIG. 4), and the RW controlling CPU 210 of the RW 200 perform the respective processing described above by executing a program. However, the program may be installed from a removable recording medium, may be downloaded and installed from an internet site or broadcast waves, or the like.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device comprising:
a first master communication means which performs a first communication which is proximity communication at a first communication speed;
a second master communication means which performs a second communication which is proximity communication at a second communication speed faster than the first communication speed;
an electrical power transmission means where a slave communication device which receives a supply of electrical power to perform the second communication transmits electrical power to perform the second communication using wireless electrical power transmission; and
a monitoring means which monitors electrical power supplied to the slave communication device using the wireless electrical power transmission,
wherein the first master communication means receives configuration information including a maximum electrical power consumption, which the slave communication device consumes in the second communication, from the slave communication device using the first communication,
the electrical power transmission means begins wireless electrical power transmission after the first communication with the slave communication device begins,
the second master communication means begins the second communication with the slave communication device after the wireless electrical power transmission has begun, and the electrical power transmission means stops the wireless electrical power transmission in a case when the electrical power monitored by the monitoring means exceeds a threshold set from the maximum electrical power consumption.

2. The communication device according to claim 1,
wherein the first master communication means performs mutual authentication with the slave communication device using the first communication, and after the mutual authentication is successful, receives the configuration information from the slave communication device.

3. The communication device according to claim 1,
wherein the configuration information further includes communication information relating to the second communication performed by the slave communication device, and
the second communication by the second master communication means and wireless electrical power transmission by the electrical power transmission means are begun in a case when it is determined that it is possible for the second master communication means to perform the second communication with the slave communication device based on the communication information.

4. The communication device according to claim 3,
wherein the communication information includes information on a communication method of the second communication performed by the slave communication device and on the arrangement state of an antenna used by the slave communication device in the second communication.

5. The communication device according to claim 1,
wherein the configuration information further includes wireless electrical power transmission information relating to the wireless electrical power transmission where the slave communication device receives a supply of electrical power by wireless electrical power transmission, and
the second communication by the second master communication means and the wireless electrical power transmission by the electrical power transmission means are begun in a case when it is determined that it is possible for the electrical power transmission means to perform a supply of the electrical power to the slave communication device by wireless electrical power transmission based on the wireless electrical power transmission information.

6. The communication device according to claim 5,
wherein the wireless electrical power transmission information includes information on a wireless electrical power transmission method of wireless electrical power transmission where the slave communication device receives a supply of electrical power and on the arrangement state of an antenna used by the slave communication device in receiving a supply of electrical power by the wireless electrical power transmission.

7. A communication method of a communication device provided with a first master communication means which performs a first communication which is proximity communication at a first communication speed, a second master communication means which performs a second communication which is proximity communication at a second communication speed faster than the first communication speed, an electrical power transmission means where a slave communication device which receives a supply of electrical power to perform the second communication transmits electrical power to perform the second communication using wireless electrical power transmission, and a monitoring means which monitors the electrical power supplied to the slave communication device using wireless electrical power transmission, comprising the steps of:

receiving configuration information including a maximum electrical power consumption, which the slave communication device consumes in the second communication, from the slave communication device using the first master communication means using the first communication;

starting the wireless electrical power transmission using the electrical power transmission means after the first communication with the slave communication device begins;

starting the second communication with the slave communication device using the second master communication means after the wireless electrical power transmission has begun; and stopping the wireless electrical power transmission using the electrical power transmission means in a case when the electrical power monitored by the monitoring means exceeds a threshold set from the maximum electrical power consumption.

8. A communication device comprising:
a first slave communication means which performs a first communication which is proximity communication at a first communication speed;
a second slave communication means which performs a second communication which is proximity communication at a second communication speed faster than the first communication speed; and
an electrical power reception means which receives electrical power to perform the second communication transmitted using wireless electrical power transmission from a master communication device which supplies electrical power to perform the second communication,
wherein the first slave communication means transmits configuration information including a maximum electrical power consumption consumed in the second communication to the master communication device using the first communication,
the electrical power reception means receives electrical power which begins being transmitted from the master communication device after the first communication with the master communication device begins, and
the second slave communication means begins operating using electrical power received by the electrical power reception means and begins the second communication with the master communication device.

9. The communication device according to claim 8,
wherein the first slave communication means performs mutual authentication with the master communication device using the first communication, and after the mutual authentication is successful, sends the configuration information to the master communication device.

10. The communication device according to claim 8,
wherein the configuration information further includes communication information relating to the second communication performed by the communication device, and
the communication information includes information on a communication method of the second communication performed by the communication device and on the arrangement state of an antenna used by the communication device in the second communication.

11. The communication device according to claim 8,
wherein the configuration information further includes wireless electrical power transmission information relating to wireless electrical power transmission where the communication device receives a supply of electrical power by wireless electrical power transmission, and
the wireless electrical power transmission information includes information on a wireless electrical power transmission method of wireless electrical power transmission where the communication device receives a supply of electrical power and on the arrangement state of an antenna used by the communication device in receiving a supply of electrical power by the wireless electrical power transmission.

12. A communication method of a communication device provided with a first slave communication means which performs a first communication which is proximity communication at a first communication speed, a second slave communication means which performs a second communication which is proximity communication at a second communication speed faster than the first communication speed, and an electrical power reception means which receives electrical power to perform the second communication transmitted using wireless electrical power transmission from a master communication device which supplies electrical power to perform the second communication, comprising the steps of:
transmitting configuration information including maximum electrical power consumption consumed in the second communication to the master communication device using the first slave communication means using the first communication;
receiving electrical power which begins being transmitted from the master communication device using the electrical power reception means after the first communication with the master communication device begins; and
starting to operate using electrical power received by the electrical power reception means and starting the second communication with the master communication device using the second slave communication means.

13. A communication system comprising:
a master communication device which supplies electrical power; and
a slave communication device which receives a supply of electrical power;
wherein the master communication device includes
a first master communication means which performs a first communication which is proximity communication at a first communication speed;
a second master communication means which performs a second communication which is proximity communication at a second communication speed faster than the first communication speed;
an electrical power transmission means where the slave communication device transmits electrical power to perform the second communication using wireless electrical power transmission; and
a monitoring means which monitors the electrical power supplied to the slave communication device using wireless electrical power transmission,
wherein the first master communication means receives configuration information including a maximum electrical power consumption, which the slave communication device consumes in the second communication, from the slave communication device using the first communication,
the electrical power transmission means begins the wireless electrical power transmission after the first communication with the slave communication device begins,
the second master communication means begins the second communication with the slave communication device after the wireless electrical power transmission has begun, and
the electrical power transmission means stops the wireless electrical power transmission in a case when the electrical power monitored by the monitoring means exceeds a threshold set from the maximum electrical power consumption; and
wherein the slave device includes
a first slave communication means which performs the first communication;
a second slave communication means which performs the second communication; and
an electrical power reception means which receives the electrical power to perform the second communication transmitted using wireless electrical power transmission from the master communication device,
wherein the first slave communication means transmits the configuration information including the maximum electrical power consumption consumed in the second communication to the master communication device using the first communication,
the electrical power reception means receives the electrical power which begins being transmitted from the master communication device after the first communication with the master communication device begins, and
the second slave communication means begins operating using the electrical power received by the electrical power reception means and begins the second communication with the master communication device.

14. A communication method of a communication system provided with a master communication device which supplies electrical power and a slave communication device which receives a supply of electrical power, wherein the master communication device has a first master communication means which performs a first communication which is proximity communication at a first communication speed, a second master communication means which performs a second communication which is proximity communication at a second communication speed faster than the first communication speed, an electrical power transmission means where the slave communication device transmits electrical power to perform the second communication using wireless electrical power transmission, and a monitoring means which monitors the electrical power supplied to the slave communication device using wireless electrical power transmission, and the slave communication device has a first slave communication means which performs the first communication, a second slave communication means which performs the second communication, and an electrical power reception means which receives the electrical power to perform the second communication transmitted using wireless electrical power transmission from the master communication device, comprising the steps of:
receiving configuration information including a maximum electrical power consumption, which the slave communication device consumes in the second communication, from the slave communication device using the first master communication means using the first communication;

starting wireless electrical power transmission using the electrical power transmission means after the first communication with the slave communication device begins;
starting the second communication with the slave communication device using the second master communication means after the wireless electrical power transmission has begun; and
stopping the wireless electrical power transmission using the electrical power transmission means in a case when the electrical power monitored by the monitoring means exceeds a threshold set from the maximum electrical power consumption, in the master communication device; and
transmitting the configuration information including the maximum electrical power consumption consumed in the second communication to the master communication device using the first slave communication means using the first communication;
receiving the electrical power which begins being transmitted from the master communication device using the electrical power reception means after the first communication with the master communication device begins; and
starting to operate using the electrical power received by the electrical power reception means and starting the second communication with the master communication device using the second slave communication means, in the slave communication device.

16. A communication device comprising:
a first master communication section which performs a first communication which is proximity communication at a first communication speed;
a second master communication section which performs a second communication which is proximity communication at a second communication speed faster than the first communication speed;
an electrical power transmission section where a slave communication device which receives a supply of electrical power to perform the second communication transmits electrical power to perform the second communication using wireless electrical power transmission; and
a monitoring section which monitors electrical power supplied to the slave communication device using the wireless electrical power transmission,
wherein the first master communication section receives configuration information including a maximum electrical power consumption, which the slave communication device consumes in the second communication, from the slave communication device using the first communication,
the electrical power transmission section begins wireless electrical power transmission after the first communication with the slave communication device begins,
the second master communication section begins the second communication with the slave communication device after the wireless electrical power transmission has begun, and
the electrical power transmission section stops the wireless electrical power transmission in a case when the electrical power monitored by the monitoring section exceeds a threshold set from the maximum electrical power consumption.

16. A communication device comprising:
a first slave communication section which performs a first communication which is proximity communication at a first communication speed;
a second slave communication section which performs a second communication which is proximity communication at a second communication speed faster than the first communication speed; and
an electrical power reception section which receives electrical power to perform the second communication transmitted using wireless electrical power transmission from a master communication device which supplies electrical power to perform the second communication,
wherein the first slave communication section transmits configuration information including a maximum electrical power consumption consumed in the second communication to the master communication device using the first communication,
the electrical power reception section receives electrical power which begins being transmitted from the master communication device after the first communication with the master communication device begins, and
the second slave communication section begins operating using electrical power received by the electrical power reception section and begins the second communication with the master communication device.

* * * * *